United States Patent
Amitani et al.

(10) Patent No.: US 6,476,394 B1
(45) Date of Patent: Nov. 5, 2002

(54) RADIATION IMAGE CAPTURING APPARATUS

(75) Inventors: Kouji Amitani, Hino (JP); Hisashi Yonekawa, Hino (JP); Tsutomu Kawano, Hino (JP); Akira Ishisaka, Hino (JP)

(73) Assignee: Konica Corporation (JP)

( * ) Notice: Subject to any disclaimer, the term of this patent is extended or adjusted under 35 U.S.C. 154(b) by 5 days.

(21) Appl. No.: 09/718,548

(22) Filed: Nov. 22, 2000

(30) Foreign Application Priority Data

Nov. 26, 1999 (JP) .......................... 11-336900
Jun. 13, 2000 (JP) ....................... 2000-177386

(51) Int. Cl.⁷ ................................................. G01T 1/20
(52) U.S. Cl. .................................. 250/368; 250/370.11
(58) Field of Search ..................... 250/363.07, 363.09, 250/370.09, 368, 370.11

(56) References Cited

U.S. PATENT DOCUMENTS 5,569,907 A * 10/1996 Meunier ................. 250/208.1
5,920,604 A * 7/1999 Laupper et al. ......... 378/98.12

OTHER PUBLICATIONS

L.E. Antonuk, et al., "Development of A High Resolution, Active Matrix, Flat–Panel Imager With Enhanced Fill Factor", SPIE vol. 3032, pp. 2–13 (1997).
John Rowlands, et al., "Amorphous Semiconductors Usher In Digital X–Ray Imaging", Nov. 1997, Physics Today, pp. 24–30.

* cited by examiner

Primary Examiner—Constantine Hannaher
(74) Attorney, Agent, or Firm—Cantor Colburn LLP

(57) ABSTRACT

A radiation image capturing apparatus, comprises a radiation image detector arranged so a to face a radiation source or an object and comprising a scintillator to receive a radiation image and to emit image light; a lens unit array comprising a plurality of lens units and to focus the image light; and a plurality of area sensors arranged so as to correspond in number to the plurality of lens units and to convert the focused image light into image data; and a calibrating device comprising a repetition pattern provided at a light incident side of the plurality of area sensors and to conduct calibration to correct the image data converted by the plurality of area sensors on the basis of the repetition pattern.

55 Claims, 21 Drawing Sheets

| -1 | 0 | 2 | 0 | -1 |

| -1 |
| 0 |
| 2 |
| 0 |
| -1 |

PIXEL OF REMARK. (TARGET PIXEL)

PIXEL OF REMARK. (TARGET PIXEL)

RADIATION IMAGE CAPTURING APPARATUS

This invention relates to a radiation image capturing apparatus for use in X-ray mammography, the radiographing of a chest or bones of limbs, etc., for example.

For a system for use in radiography for medical diagnosis, an image forming system, in which a silver halide photographic film is brought in close contact with a fluorescent intensifying screen, exposed to an X-ray image, developed by an automatic developing apparatus, fixed, rinsed, and dried, has been heretofore used generally.

In such an X-ray image diagnosis for medical use or a non-destructive inspection, what is called an X-ray film using a silver halide emulsion has been broadly used. Especially in image diagnosis for medical use, a screen film system having a intensifying screen and an X-ray film in combination has been used for about one hundred years.

Such image information is what is called analogue image information, therefore it is not possible to make such arbitrary image processing or instantaneous electrical transmission as has been done in digital image information processing which has been continuously developed in recent years.

Computed radiography (CR) as a digital technology for an X-ray image is now accepted in medical fields. However, its image sharpness is insufficient and spatial resolution is also insufficient, therefore, it has not attained an image quality level of the screen film system. Further, as a new digital X-ray imaging system, it has been developed a flat-panel X-ray detecting device (FPD) using thin film transistors (TFT) described in, for example, John Rowlands: "Amorphous Semiconductors Usher in Digital X-ray Imaging" Physics Today, November 1997, p. 24, L. E. Antonuk: "Development of a High Resolution, Active Matrix, Flat-Panel Imager with Enhanced Fill Factor", SPIE, vol. 3032, p. 2, (1997), etc.

This has the advantage that its apparatus is made more small-sized than CR and its image quality is excellent. However, on the other hand, it has the defects that an enormous expense and a long period is necessary in newly developing an FPD using thin film transistors (TFT), and that, from the viewpoint of the manufacturing technology and the S/N ratio of the image obtained, it is difficult to make the pixel size small, which makes the resolution of the image low as 3–4 lp/mm or so.

If a radiation image can be obtained by using a number of low-priced area sensors such as CCD or CMOS sensors, the reliability as a sensor is high, the manufacturing cost can be reduced, and resolution of the image can be easily raised.

Incidentally, in order to obtain an image by an FPD, it is necessary such correction of the signal value as is represented by offset correction and gain correction; first, the signal value of each pixel when it is not exposed to a radiation and the signal value when it is exposed to a uniform radiation which has not been transmitted through the object of radiographing are obtained, to obtain image data for correction (correction data). This operation is generally called calibration. In an FPD using a number of area sensors, it is necessary to combine images which have been obtained by the respective area sensors; therefore, on top of the above-described correction of the signal value, geometrical corrections such as parallel shift, rotation, and a correction of distortion become necessary. For these geometrical corrections, it is necessary that the condition of the mounting of each area sensor and the lens unit can cope with the variation with the passage of time and the variation owing to environmental temperature, vibration, impact, etc; therefore, they are more complex than a mere correction of a signal value, and in most cases, because an error in the corrections makes a great hindrance in diagnosis, the corrections must be carried out more reliably than the correction of a signal value. Further, in order to carry out the combination of images in the case where a number of area sensors are used precisely in a practically short time, it has been necessary to grasp the positional relation of the sensors precisely.

SUMMARY OF INVENTION

This invention has been done in view of the above-described actual circumstances, and it is an object of the invention to provide a radiation image capturing apparatus which has a high reliability by calibration, and is capable of being subjected to the reduction of manufacturing cost, raising the resolution of the image easily, and being made flat-shaped and of light weight.

In order to solve the above-described problems and accomplish the object, this invention has any one of the structures described below.

(1) A radiation image capturing apparatus provided with a radiation image detector having a structure in which a scintillator, a lens unit array, and area sensors corresponding to each lens unit of the lens unit array are arranged in this order, further comprising a calibration practicing means for obtaining image data for correction by automatically carrying out calibration after a certain time from the turning-on of the electric power source, and a memory means for memorizing image data for correction obtained by calibration.

According to the invention described in this paragraph (1), image data for correction can be obtained by automatically carrying out calibration after a certain time from the turning-on of the electric power source; therefore, the apparatus has a high reliability and the resolution of the image can be easily raised.

(2) A radiation image capturing apparatus provided with a radiation image detector having a structure in which a scintillator, a lens unit array, and area sensors corresponding to each lens unit of the lens unit array are arranged in this order, further comprising a calibration practicing means for obtaining image data for correction by automatically carrying out calibration after passage of a certain time from the former calibration while the electric power source is kept turned on, and a memory means for memorizing image data for correction obtained by calibration.

According to the invention described in this paragraph (2), calibration can be automatically carried out when a certain set time has passed with the timer counting from the former calibration while the electric power source is kept turned on; therefore, the apparatus has a high reliability and the resolution of the image can be easily raised.

(3) A radiation image capturing apparatus provided with a radiation image detector having a structure in which a scintillator, a lens unit array, and area sensors corresponding to each lens unit of the lens unit array are arranged in this order and comprising a means for counting the cumulative number of times of image capturing, further comprising a calibration practicing means for obtaining image data for correction by automatically carrying out calibration when the number of times of image capturing from the former calibration has reached a specified number of times, and a memory means for memorizing image data for correction obtained by calibration.

According to the invention described in this paragraph (3), calibration can be automatically carried out when the number of times of image capturing from the former calibration has reached the specified number of times with a counter counting the number of times of image capturing; therefore, the apparatus has a high reliability and the resolution of the image can be easily raised.

(4) A radiation image capturing apparatus provided with a radiation image detector having a structure in which a scintillator, a lens unit array, and area sensors corresponding to each lens unit of the lens unit array are arranged in this order, further comprising a calibration specifying means for specifying the method and/or the timing of calibration.

According to the invention described in this paragraph (4), the method and/or the timing of calibration can be specified and an operator can arbitrarily vary the method and/or the timing of calibration in accordance with, for example, the operational condition of the radiation image capturing apparatus.

(5) A radiation image capturing apparatus as set forth in any one of the paragraphs (1) to (4), further comprising an captured-image-processing preferring means for carrying out calibration in the case where image capturing or captured-image-processing has already started at the predetermined time for calibration, after the image capturing or the captured-image-processing has been completed.

According to the invention described in this paragraph (5), in the case where image capturing or captured-image-processing has started at the predetermined time for calibration, calibration is carried out after the image capturing or captured-image-processing has been completed, therefore, image capturing or captured-image-processing is never interrupted.

(6) A radiation image capturing apparatus provided with a radiation image detector having a structure in which a scintillator, a lens unit array, and area sensors corresponding to each lens unit of the lens unit array are arranged in this order, further comprising a calibration start operating means for starting calibration at an arbitrary timing.

According to the invention described in this paragraph (6), by starting calibration at an arbitrary timing, calibration can be started at an arbitrary timing, for example, in accordance with the operational condition of the radiation image capturing apparatus.

(7) A radiation image capturing apparatus as set forth in any one of the paragraphs (1) to (6), further comprising an alarm means for warning, during calibration, that the apparatus is in process of calibration.

According to the invention described in this paragraph (7), it is possible to warn, during calibration, that the apparatus is in process of calibration, and to notify that the apparatus is in process of calibration by an alarm display or a buzzer.

(8) A radiation image capturing apparatus as set forth in any one of the paragraphs (1) to (7), further comprising an image capturing forbidding warning means for urging the stop of start of image capturing or captured-image-processing during calibration.

According to the invention described in this paragraph (8), calibration can be preferred by urging the stop of start of image capturing or captured-image-processing during calibration.

(9) A radiation image capturing apparatus as set forth in any one of the paragraphs (1) to (8), further comprising an image capturing forbidding means for forbidding image capturing or captured-image-processing during calibration.

According to the invention described in this paragraph (9), image capturing or captured-image-processing is forbidden during calibration, and for example, even when the image capturing start switch is pressed, the start of image capturing or captured-image-processing can not be carried out.

(10) A radiation image capturing apparatus as set forth in any one of the paragraphs (1) to (7), further comprising image capturing wedging means for interrupting calibration and wedging image capturing into it using correction data immediately before it for the captured-image-processing, in the case where a request for image capturing or captured-image-processing is made during calibration.

According to the invention described in this paragraph (10), in the case where a request for image capturing or captured-image-processing is made during calibration, calibration is interrupted and image capturing is wedged into it; therefore the apparatus can cope with the case where it is necessary to prefer to do image capturing or captured-image-processing immediately, for example, as an urgent measure.

(11) A radiation image capturing apparatus as set forth in any one of the paragraphs (1) to (10), further comprising plural sets of correction data.

According to the invention described in this paragraph (11), the plural sets of correction data obtained by a plurality of times of calibration are memorized, and they can be used selectively at need.

(12) A radiation image capturing apparatus as set forth in the paragraph (11), wherein the latest correction data are preferentially used in captured-image-processing.

According to the invention described in this paragraph (12), by using preferentially the latest correction data in captured-image-processing, correction and combination of images can be more precisely carried out and the resolution of the image can be raised easily.

(13) A radiation image capturing apparatus as set forth in any one of the paragraphs (1) to (11), wherein correction data which are renewed in such a manner as to always include the latest data are memorized.

According to the invention described in this paragraph (13), by memorizing correction data which are renewed in such a manner as to always include the latest data, the latest correction data are certainly memorized even though the information volume of the memorized correction data reaches nearly to the limit of the memory capacity of the memory means; therefore, it is possible to make the apparatus use the latest correction data in captured-image-processing. (14) A radiation image cap turing apparatus as set forth in any one of the paragraphs (1) to (13), wherein at least one of correction data and original image data are memorized together with image data after correction as a set.

According to the invention described in this paragraph (14), because at least one of correction data and original image data is memorized together with image data after correction as a set, image data after correction and at least one of the correction data used in correction and the corresponding original image data can be approached simply and certainly, and the condition of the radiation image capturing apparatus at the time of image capturing can be known simply and certainly.

(15) A radiation image capturing apparatus as set forth in any one of the paragraphs (1) to (14), further comprising discriminating information for correction data and original data corresponding to each other as incidental information to image data after correction.

According to the invention described in this paragraph (15), the apparatus comprises discriminating information for correction data and original image data corresponding to each other as incidental information to image data after correction; therefore, correction data and original image data corresponding to each other can be discriminated simply and certainly from the incidental information, and the condition of the radiation image capturing apparatus at the time of photographing can be known simply and certainly.

(16) A radiation image capturing apparatus as set forth in any one of the paragraphs (1) to (15), further comprising correction data production judging means for judging if correction data have been produced and correction data non-use warning means for issuing a warning in the case where correction data have not been produced.

According to the invention described in this paragraph (16), by issuing a warning in the case where correction data have not been produced for the reason, for example, such as that the area sensors have not functioned at the time of calibration, that X-rays have not been applied to the object, or that correction data are not memorized in the memory means, calibration can be carried out again.

(17) A radiation image capturing apparatus as set forth in any one of the paragraphs (1) to (15), further comprising correction data production judging means for judging if making a correction by the correction data is suitable and correction data non-use warning means for issuing a warning in the case where making a correction is not suitable.

According to the invention described in this paragraph (17), by judging if to make correction by the correction data is suitable and issuing a warning in the unsuitable case, calibration can be carried out again.

(18) A radiation image capturing apparatus as set forth in any one of the paragraphs (1) to (17), said radiation image capturing apparatus being capable of outputting the image of at least one of correction data and original image data.

According to the invention described in this paragraph (18), it is possible to output the image of at least one of correction data and original image data onto a sheet of the transparent type or of the reflection type by a laser exposure apparatus of the scanning type, an ink jet printer, or the like, or onto a display device such as a CRT, or liquid crystal display; therefore, the condition of the radiation image capturing apparatus at the time of image capturing can be known easily and certainly.

(19) A radiation image capturing apparatus as set forth in any one of the paragraphs (1) to (18), said radiation image capturing apparatus being capable of outputting the image of at least one of correction data and original image data together with the image of data after correction.

According to the invention described in this paragraph (19), it is possible to output the image of at least one of correction data and original image data together with the image of data after correction onto a sheet of the transparent type or of the reflection type by a laser exposure apparatus of the scanning type, an ink jet printer, or the like, or onto a display device such as a CRT, or liquid crystal display; therefore, the condition of the radiation image capturing apparatus at the time of photographing can be known easily and certainly, and further, by referring to the both images for comparison, more precise observation and diagnosis can be made.

(20) A radiation image capturing apparatus as set forth in any one of the paragraphs (1) to (19), said radiation image capturing apparatus being capable of specifying which one or two is to be displayed out of correction data, original image data, and data after correction by a control means.

According to the invention described in this paragraph (20), by displaying any one or two of correction data, original image data, and data after correction, the condition of the radiation image capturing apparatus at the time of image capturing can be known easily and certainly, and further, by referring to the both images for comparison, more precise observation and diagnosis can be made.

(21) A radiation image capturing apparatus as set forth in any one of the paragraphs (1) to (20), said radiation image capturing apparatus being capable of displaying the information of a defective pixel detected by calibration for data after correction.

According to the invention described in this paragraph (21), by displaying the information of a defective pixel detected by calibration, the condition of the radiation image capturing apparatus at the time of image capturing can be known easily and certainly, and further, more precise observation and diagnosis can be made.

(22) A radiation image capturing apparatus as set forth in any one of the paragraphs (1) to (21), said radiation image capturing apparatus carrying out calibration with a higher resolution than the reading of an image at the time of image capturing.

According to the invention described in this paragraph (22), by carrying out calibration with a higher resolution than the reading of an image at the time of image capturing, more precise correction data can be obtained.

(23) A radiation image capturing apparatus as set forth in the paragraph (22), wherein correction data which are produced with a higher resolution than the reading of an image are used for geometrical corrections such as parallel shift, rotation, and a correction of distortion, and correction data which are produced by using data obtained for pixels with the additional ones to pixel size at the time of the reading of an image are used for signal value corrections such as an offset correction and a gain correction.

According to the invention described in this paragraph (23), by obtaining correction data by calibration, the apparatus has a high reliability and the resolution of the image can be easily raised.

(24) A radiation image capturing apparatus as set forth in any one of the paragraphs (1) to (23), said radiation image capturing apparatus carrying out geometrical corrections after making signal value corrections.

According to the invention described in this paragraph (24), by obtaining correction data through carrying out geometrical corrections after making signal value corrections, the apparatus has a high reliability and the resolution of the image can be easily raised.

(25) A radiation image capturing apparatus as set forth in any one of the paragraphs (1) to (23), said radiation image capturing apparatus carrying out signal value corrections after making geometrical corrections.

According to the invention described in this paragraph (25), by obtaining correction data through carrying out signal value corrections after making geometrical corrections, the apparatus has a high reliability and the resolution of the image can be easily raised.

(26) A radiation image capturing apparatus as set forth in any one of the paragraphs (1) to (25), wherein geometrical corrections are corrections in which affine transformations such as shift, rotation, enlargement, and reduction is carried out after making a correction of distortion.

According to the invention described in this paragraph (26), geometrical corrections are corrections in which affine transformations such as parallel shift, rotation, enlargement, and reduction is carried out after making a correction of distortion, and by obtaining correction data in this way, the apparatus has a high reliability and the resolution of the image can be easily raised.

(27) A radiation image capturing apparatus as set forth in the paragraph (25), said radiation image capturing apparatus, in the case where only signal value corrections are made as calibration, carrying out geometrical corrections using the latest correction data, and after that, carrying out calibration in order to obtain correction data for making only signal value corrections, and carrying out signal value corrections only using data for signal value corrections obtained by the calibration.

According to the invention described in this paragraph (27), in the case where only signal value corrections are made as calibration, geometrical corrections are carried out using the latest correction data, after that, calibration is carried out in order to obtain correction data for making only signal value corrections, and signal value corrections only are carried out using data for signal value corrections obtained by the calibration, to obtain correction data; therefore, the apparatus has a high reliability and the resolution of the image can be easily raised.

(28) A radiation image capturing apparatus provided with a radiation image detector having a structure in which a scintillator, a lens unit array, and area sensors corresponding to each lens unit of the lens unit array are arranged in this order, wherein calibration is carried out using a repetition pattern provided outside the sensor area.

According to the invention described in this paragraph (28), calibration is carried out using a repetition pattern; therefore, with a simple structure, precise correction data can be obtained.

(29) A radiation image capturing apparatus as set forth in the paragraph (28), wherein the aforesaid repetition pattern is approximately of equal interval.

According to the invention described in this paragraph (29), the repetition pattern is approximately of equal interval; therefore, precise correction data can be obtained.

(30) A radiation image capturing apparatus as set forth in the paragraph (28) or (29), wherein the aforesaid repetition pattern is corresponding to the arrangement of the area sensors.

According to the invention described in this paragraph (30), the repetition pattern is corresponding to the arrangement of the area sensors; therefore, precise correction data can be obtained.

(31) A radiation image capturing apparatus as set forth in any one of the paragraphs (28) to (30), wherein the aforesaid repetition pattern is disposed at the X-ray source side on the outer flat plane portion of the radiation image detector.

According to the invention described in this paragraph (31), correction data can be obtained through calibrating the whole of the radiation image detector.

(32) A radiation image capturing apparatus as set forth in the paragraph (31), wherein the aforesaid repetition pattern is made of an X-ray intercepting substance.

According to the invention described in this paragraph (32), the repetition pattern is made of an X-ray intercepting substance; therefore, correction data can be obtained from a precise and distinct repetition pattern.

(33) A radiation image capturing apparatus as set forth in any one of the paragraphs (28) to (30), wherein the aforesaid repetition pattern is disposed adjacent to the scintillator at the reverse side to the area sensors inside the radiation image detector.

According to the invention described in this paragraph (33), because the repetition pattern is disposed inside the radiation image detector, it is easy to keep the positional relation to the lens units or to the area sensors always in the same condition; therefore, precise correction data with a high reproducibility can be obtained.

(34) A radiation image capturing apparatus as set forth in the paragraph (33), wherein the aforesaid repetition pattern is made of an X-ray intercepting substance.

According to the invention described in the paragraph (34), the repetition pattern is made of an X-ray intercepting substance; therefore, correction data can be obtained from a precise and distinct repetition pattern.

(35) A radiation image capturing apparatus as set forth in any one of the paragraphs (28) to (30), wherein the aforesaid repetition pattern is disposed between the scintillator and the area sensors.

According to the invention described in the paragraph (35), because the repetition pattern is disposed inside the radiation image detector, it is easy to keep the positional relation to the lens units or to the area sensors always in the same condition; therefore, precise correction data with a high reproducibility can be obtained.

(36) A radiation image capturing apparatus as set forth in the paragraph (35), wherein the aforesaid repetition pattern is disposed on the surface at the area sensor side of the scintillator.

According to the invention described in the paragraph (36), a distinct image of the repetition pattern produced by the fluorescence of the scintillator can be utilized in calibration; therefore, more precise correction data can be obtained.

(37) A radiation image capturing apparatus as set forth in the paragraph (35), wherein the aforesaid repetition pattern is positioned on the surface of a transparent member which is disposed between the scintillator and the area sensors, said surface of a transparent member facing the scintillator.

According to the invention described in the paragraph (37), a distinct image of the repetition pattern produced by the fluorescence of the scintillator can be utilized in calibration; therefore, more precise correction data can be obtained.

(38) A radiation image capturing apparatus as set forth in the paragraph (37), wherein the aforesaid transparent member is a glass plate.

According to the invention described in the paragraph (38), the transparent member is a glass plate and of low cost, and further, because a glass plate has a high stiffness, precise correction data with a high reproducibility can be obtained.

(39) A radiation image capturing apparatus as set forth in any one of the paragraphs (35) to (38), wherein the aforesaid repetition pattern is formed of a light intercepting material.

According to the invention described in the paragraph (39), the repetition pattern is formed of a light intercepting material; therefore, correction data can be obtained from a precise and distinct repetition pattern.

(40) A radiation image capturing apparatus as set forth in any one of the paragraphs (35) to (39), wherein at least a part of the repetition pattern is positioned at the overlapping portion of the sensing areas of the neighboring two area sensors.

According to the invention described in the paragraph (40), because at least a part of the repetition pattern is positioned at the overlapping portion of the sensing areas of the neighboring two area sensors and captured commonly by the two area sensors, the mutual positional relation of the neighboring two area sensors can be known precisely; therefore, precise correction data for the overlapping portion of the image area can be obtained.

(41) A radiation image capturing apparatus as set forth in any one of the paragraphs (28) to (40), wherein the aforesaid repetition pattern is dot-shaped.

According to the invention described in the paragraph (41), the repetition pattern is dot-shaped; therefore, precise correction data can be obtained.

(42) A radiation image capturing apparatus as set forth in any one of the paragraphs (28) to (40), wherein the aforesaid repetition pattern is line-shaped.

According to the invention described in the paragraph (42), the repetition pattern is line-shaped; therefore, precise correction data can be obtained.

(43) A radiation image capturing apparatus as set forth in any one of the paragraphs (28) to (42), wherein the line width of the aforesaid repetition pattern is 3 pixels or less on the final output image.

According to the invention described in the paragraph (43), the line width of the aforesaid repetition pattern is 3 pixels or less on the final output image; therefore, precise correction data can be obtained.

(44) A radiation image capturing apparatus as set forth in any one of the paragraphs (28) to (43), wherein, in the case where the magnitude of the signal value of the pixels corresponding to the repetition pattern is lowered to a half or less of the signal value for no repetition pattern being provided, the signal value of the pixels corresponding to the repetition pattern is interpolated by using the information of the signal value of the surrounding pixels.

According to the invention described in the paragraph (44), in the case where the magnitude of the signal value of the pixels corresponding to the repetition pattern is lowered to a half or less of the signal value for no repetition pattern being provided, the signal value of the pixels corresponding to the repetition pattern is interpolated by using the information of the signal value of the surrounding pixels; therefore precise correction data can be obtained.

(45) A radiation image capturing apparatus as set forth in any one of the paragraphs (28) to (44), wherein the aforesaid repetition pattern is capable of being attached and detached.

According to the invention described in the paragraph (45), the repetition pattern is capable of being attached and detached, and at the time of image capturing, by detaching the repetition pattern, its influence to the radiation image can be eliminated.

(46) A radiation image capturing apparatus as set forth in any one of the paragraphs (35) to (45), said radiation image capturing apparatus comprising a light source inside the radiation image detector, and making the light source turned on at the time of calibration.

According to the invention described in the paragraph (46), the light source is turned on at the time of calibration; therefore, precise correction data for geometrical corrections can be obtained without application of radiation rays.

(47) A radiation image capturing apparatus as set forth in the paragraph (46), wherein the aforesaid light source is made up of a plurality of point light sources.

According to the invention described in the paragraph (47), the light source is made up of a plurality of point light sources; therefore, precise correction data can be obtained.

(48) A radiation image capturing apparatus as set forth in the paragraph (47), wherein the aforesaid point light sources are LED's.

According to the invention described in the paragraph (48), the point light sources are LED's; therefore, it is possible to make the apparatus small-sized and of light weight.

(49) A radiation image capturing apparatus as set forth in the paragraph (47) or (48), wherein one or more point light sources are provided for each of the area sensors.

According to the invention described in the paragraph (49), because one or more point light sources are provided for each of the area sensors, it is possible to make the apparatus small-sized and of light weight, and sufficient light quantity is given to each sensor reliably; therefore, precise correction data can be obtained.

(50) A radiation image capturing apparatus as set forth in the paragraph (46), wherein light from the light source is applied from the side surface of the transparent member which is placed between the scintillator and the area sensors.

According to the invention described in the paragraph (50), because light from the light source is applied from the side surface of the transparent member which is placed between the scintillator and the area sensors, the light is transmitted through the transparent member and can illuminate a wide range; therefore, precise correction data can be obtained.

(51) A radiation image capturing apparatus as set forth in the paragraph (50), wherein the aforesaid transparent member is a diffuser plate and capable of being attached and detached.

According to the invention described in the paragraph (51), because the transparent member is a diffuser plate and light can be diffused to a wide range, precise correction data can be obtained; further, because the transparent member is capable of being attached and detached, it can be detached at the time of image capturing, which makes it possible to obtain a distinct radiation image.

(52) A radiation image capturing apparatus as set forth in any one of the paragraphs (47) to (51), wherein the aforesaid light from the light source is infrared rays, and the aforesaid repetition pattern is formed of a member which absorbs or reflects infrared rays and transmits visible light.

According to the invention described in the paragraph (52), the light from the light source is infrared rays, and the aforesaid repetition pattern is formed of a member which absorbs or reflects infrared rays and transmits visible light; therefore, a radiation image appearing as fluorescent light from the scintillator can be obtained without being influenced by the repetition pattern.

(53) A radiation image capturing apparatus as set forth in any one of the paragraphs (47) to (52), said radiation image capturing apparatus detecting the breakdown of the light source and making a display or warning.

According to the invention described in this paragraph (53), by detecting the breakdown of the light source and making a display or warning, the possibility of the breakdown of the light source during calibration is made extremely small.

(54) A radiation image capturing apparatus as set forth in the paragraph (53), said radiation image capturing apparatus being provided with a light source breakdown detecting means for detecting the breakdown of the light source at the time of actuating the electric power source.

According to the invention described in this paragraph (54), by detecting the breakdown of the light source at the time of actuating the electric power source, the possibility of the breakdown of the light source during calibration is made extremely small.

(55) A radiation image capturing apparatus which converts it into visible light by a scintillator, the information of an object of image capturing obtained by a radiation generated by a radiation generating means being transmitted through the object of image capturing, and further converts the visible light obtained by the conversion into an electrical signal through a lens unit or an array of lens units by an area sensor disposed at the position corresponding to said lens unit, to form a radiation image, said radiation image capturing apparatus comprising position correcting means for correcting the positional deviation of pixels which is produced by the optical distortion produced by said lens unit and the positional deviation of said area sensor, a calibration chart for correcting a position provided at the surface of said scintillator or at a position equivalent to it, and a basic plane for disposing said calibration chart at a specified position with respect to the optical axis of the lens unit.

(56) A radiation image capturing apparatus as set forth in the paragraph (55), wherein the aforesaid calibration chart is disposed in a manner such that the positional deviation of the point on the calibration chart which is corresponding to the optical axis of the lens unit from the optical axis of the lens unit is equivalent to 5 pixels or less on the final output image.

(57) A radiation image capturing apparatus as set forth in the paragraph (56), wherein the aforesaid calibration chart is of point symmetry with respect to the point corresponding to the optical axis of the lens unit.

(58) A radiation image capturing apparatus as set forth in any one of the paragraphs (55) to (57), wherein the aforesaid calibration chart is lattice-shaped.

(59) A radiation image capturing apparatus as set forth in any one of the paragraphs (55) to (58), wherein the line width of the aforesaid calibration chart projected on the area sensor is smaller than 1 pixel of the area sensor.

(60) A radiation image capturing apparatus which converts it into visible light by a scintillator, the information of an object of image capturing obtained by a radiation generated by a radiation generating means being transmitted through the object of image capturing, and further converts the visible light obtained by the conversion into an electrical signal through a lens unit or an array of lens units by an area sensor disposed at the position corresponding to said lens unit, to form a radiation image, said radiation image capturing apparatus comprising position correcting means for correcting the positional deviation of pixels which is produced by the optical distortion produced by said lens unit and the positional deviation of said area sensor, and a calibration chart for correcting a position provided at the surface of said scintillator or at a position equivalent to it, the area occupied by the image portion of said calibration chart being 3% or less of the whole image area.

(61) A radiation image capturing apparatus as set forth in the paragraph (60), wherein the area occupied by the image portion of the aforesaid calibration chart is 1% or less of the whole image area.

(62) A radiation image capturing apparatus which converts it into visible light by a scintillator, the information of an object of image capturing obtained by a radiation generated by a radiation generating means being transmitted through the object of image capturing, and further converts the visible light obtained by the conversion into an electrical signal through a lens unit or an array of lens units by an area sensor disposed at the position corresponding to said lens unit, to form a radiation image, said radiation image capturing apparatus comprising a calibration chart for correcting a position provided at the surface of said scintillator or at a position equivalent to it, and position correcting means for correcting the positional deviation of pixels which is produced by the optical distortion produced by said lens unit and the positional deviation of said area sensor, wherein the aforesaid position correcting means comprises position recognizing means for recognizing the specified position of said calibration chart, and correction value calculating means for calculating the correction values on the basis of the positional information obtained by said position recognizing means, and by using the correction values obtained by said correction value calculating means, the image obtained by said area sensor is corrected.

(63) A radiation image capturing apparatus as set forth in the paragraph (62), wherein the aforesaid correction value calculating means calculates the correction values for the distortion aberration by the aforesaid lens unit on the basis of the positional information obtained by the aforesaid position recognizing means.

(64) A radiation image capturing apparatus as set forth in the paragraph (62), wherein the aforesaid correction value calculating means calculates the correction values of the position on the basis of the positional information obtained by the aforesaid position recognizing means.

(65) A radiation image capturing apparatus as set forth in the paragraph (62), wherein the aforesaid correction value calculating means calculates the difference in the size of images owing to the dispersion of the focal length of the lens units on the basis of the positional information obtained by the aforesaid position recognizing means.

(66) A radiation image capturing apparatus as set forth in any one of the paragraphs (62) to (65), wherein the aforesaid calibration chart is lattice-shaped, and the aforesaid position recognizing means recognizes intersecting points of the lattice as the specified positions of said calibration chart.

(67) A radiation image capturing apparatus as set forth in any one of the paragraphs (62) to (66), wherein the aforesaid correction value calculating means calculates correction values on the basis of the positional information obtained by the aforesaid position recognizing means, while it comprises correction value modifying means which carries out the correction of position with respect to one or plural basic points which are the same as or different from the aforesaid specified points recognized by said position recognizing means, and by evaluating the corrected position, modifies said correction values.

According to the invention described in the paragraph (55), by comprising a calibration chart, the apparatus can correct the positional deviation of pixels with a high precision. Further, by providing a basic plane for disposing the calibration chart or a member on which the chart is drawn at the specified position with respect to the optical axis of the lens unit, it is possible to make the adjustment of the position for making the point on the calibration chart corresponding to the optical axis of the lens unit coincide with the optical axis of the lens unit at the enlargement side of the lens; therefore, the required accuracy can be made not so high as that in the adjustment of the position done on the area sensor, which makes easy the design and manufacturing of the apparatus.

According to the invention described in the paragraph (56), by suppressing it to be equivalent to 5 pixels or less, the positional deviation between the optical axis of the lens unit and the point of correspondence on the calibration chart to the optical axis of the lens unit, the correction of distortion aberration can be made with a high precision.

According to the invention described in the paragraph (57), by making the calibration chart of point symmetry with respect to the point of correspondence to the optical axis of the lens unit, it becomes easy to produce the data for correcting the distortion aberration.

According to the invention described in the paragraph (58), by making the calibration chart lattice-shaped, and letting one lattice indicate the area of one area sensor, the junction point in combining images obtained from neighboring area sensors can be easily recognized, and the images can be combined with a high precision.

According to the invention described in the paragraph (59), by making the line width of the lattice in the lattice-shaped calibration chart projected on the area sensor smaller than 1 pixel of the area sensor, it is possible to recognize the chart correctly with the ratio of intercepting the information of the original image suppressed to the minimum, which makes it possible to carry out the correction of the image obtained from each of the area sensors with a high precision.

According to the invention described in the paragraph (60), by making the structure be one such that the area occupied by the image portion of the calibration chart is 3% or less of the image area, the area intercepted by the chart is made small, which makes it possible to obtain an image which has a small number of image deficiencies and a high reliability.

According to the invention described in the paragraph (61), by making the structure be one such that the area occupied by the image portion of the calibration chart is 1% or less of the image area, the area intercepted by the chart is made smaller than the invention set forth in the paragraph (60), which makes it possible to obtain an image which has a smaller number of image deficiencies and a higher reliability.

According to the invention described in the paragraph (62), by obtaining the correction values with reference to the calibration chart, it is possible to make the correction of images obtained from each of the area sensors with a high precision.

According to the invention described in the paragraph (63), by obtaining the correction values with reference to the calibration chart, it is possible to correct the distortion aberration of the lens unit with a high precision.

According to the invention described in the paragraph (64), by obtaining the correction values with reference to the calibration chart, it is possible to correct the parallel shift or rotation of an image owing to the positional deviation of the disposed area sensor with a high precision.

According to the invention described in the paragraph (65), by obtaining the correction values with reference to the calibration chart, it is possible to correct the difference in the size of images owing to the dispersion of the lens units with a high precision.

According to the invention described in the paragraph (66), by making the calibration chart lattice-shaped, and recognizing the intersecting points of the lattice, it is possible to make the correction of images obtained from the respective area sensors with a high precision.

According to the invention described in the paragraph (67), by comprising correction value modifying means, the apparatus can makes the correction of images obtained from the respective area sensors with a very high precision.

DETAILED DESCRIPTION OF THE PREFERRED EMBODIMENT

In the following, the embodiments of a radiation image capturing apparatus of this invention will be explained with reference to the drawings; however, it is obvious that this invention should not be limited to these embodiments.

Figure 1:
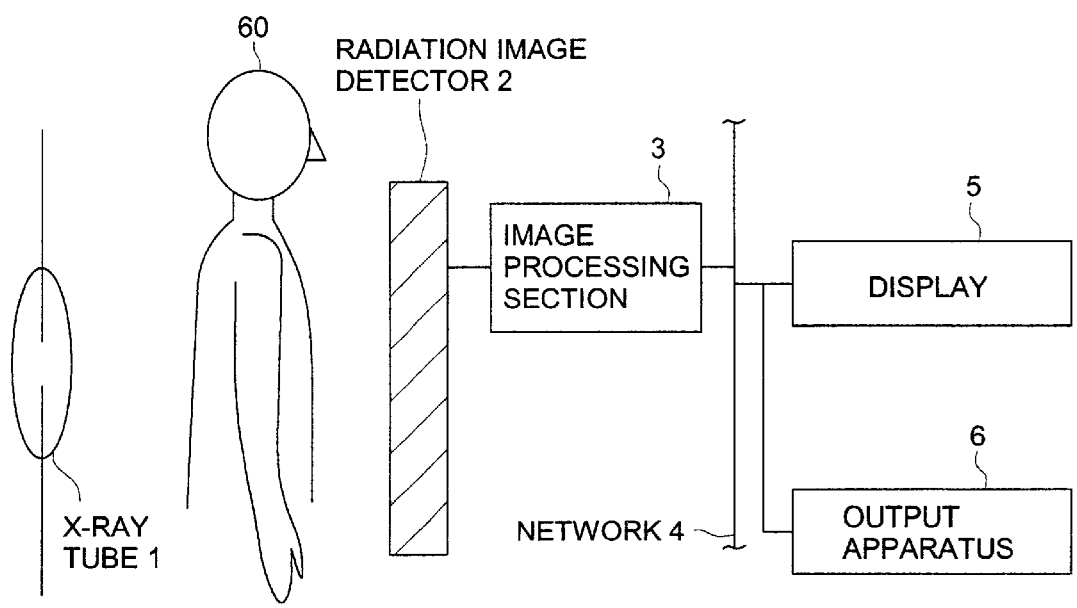
FIG. 1 is a drawing showing an example of practice of a system using a radiation image capturing apparatus.

FIG. 1 is a drawing showing an example of practice of a system using a radiation image capturing apparatus. The image capturing of the sensing object 60 is carried out by the X-rays emitted from the X-ray tube 1, to catch the X-ray image by the radiation image detector 2. The X-ray image is taken out from this radiation image detector 2 as an image signal, which is image-processed by the captured-image-processing section 3 and transmitted to the network 4. The display 5, the output apparatus 6, etc. are connected to the network 4; the X-ray image is displayed on the display 5 such as a CRT, or a liquid crystal display, or is printed and outputted by the output apparatus 6 such as a laser imager including one of the dry silver halide type, or an ink jet printer.

Figure 2:
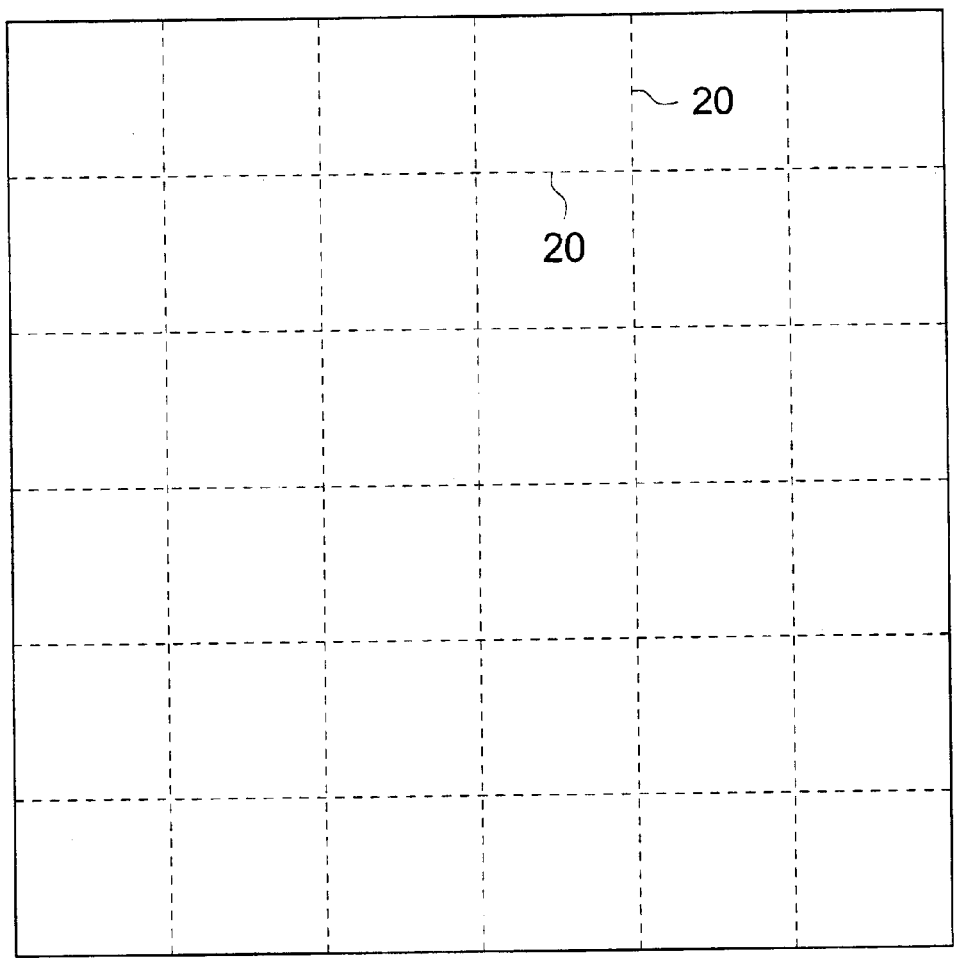
FIG. 2 is the front view of a radiation image detector.
Figure 3:
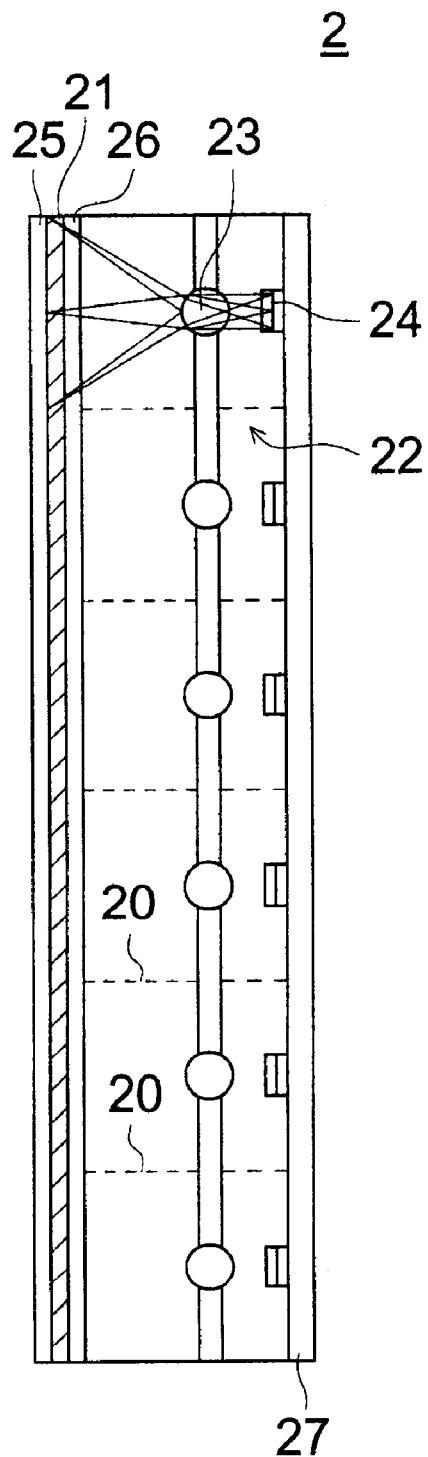
FIG. 3 is a schematic drawing of the longitudinal cross section of a radiation image detector.

The radiation image detector 2 has such a structure as shown in FIG. 2 and FIG. 3.

FIG. 2 is the front view of a radiation image detector. The dotted lines in FIG. 2 show the outline of the borders of the image areas to be detected by the respective sensor units. FIG. 2 shows the example in which there are 6×6=36 sensor units, but the number is not limited to this.

FIG. 3 is a schematic drawing showing the longitudinal cross section of a radiation image detector. The radiation image detector 2 has a structure in which the scintillator 21, the lens unit array 22, and the area sensors 24 each of which corresponds to each unit of the lens unit array are arranged in this order. The X-ray scintillator 21 is protected by the protecting member 25. Between the scintillator 21 and the lens unit array 22, there is disposed the transparent member 26, but it is also appropriate not to dispose this transparent member 26. The area sensors 24 are supported by the area sensor supporting member 27.

The shape, thickness, optical path, etc. of the radiation image detector 2 is not drawn precisely. FIG. 3 is a schematic drawing of a radiation image detector, and shows an example in the strict sense; the essential elements of this invention are the scintillator 21, the lens unit array 22, and the area sensors 24, and because the scintillator 21, the lens unit array 22, and the area sensors 24 corresponding to the lens unit array 22 are arranged in this order, the detector has a high spatial resolution to give a high image quality, and has a small thickness and is small-sized, and moreover, it has a light weight.

The scintillator 21 has substances such as gadolinium oxi-sulfides or cesium iodide which emit visible light by the irradiation of X-rays, and the scintillator 21 has a high spatial resolution to give a high image quality by emitting visible light by the irradiation of X-rays.

The lens unit 23 is made up of a group of lenses composed of a combination of a plurality, two or more, of different lenses, has a high spatial resolution to give a high image quality, and its thickness can be made small. The image forming magnification is 1/1.5 to 1/20, and if the image forming magnification is larger than 1/1.5, the distance from the X-ray scintillator 21 to the lens is too long, and the thickness of the radiation image detector 2 increases, which makes it difficult to make the detector 2 small-sized and of light weight, and further, makes the light collecting efficiency lowered, to deteriorate the S/N ratio of the image.

The effective f-number of the lens unit 23 is 8 or less, and by raising light collecting efficiency through making the effective f-number 8 or less, a detector having a high sensitivity can be actualized. An effective f-number is expressed by $Fe=S'/Ds$, where Ds is the diameter of the entrance pupil of a lens. Because light collecting efficiency is determined by the cubic angle of the entrance pupil as seen from the light emitting point, it is desirable to use a high-speed lens having a large entrance pupil, that is, a small f-number. In this invention, it is appropriate that $Fe \leq 8$.

The difference in MTF for the center and the peripheral portion of the image forming surface of the lens unit 23 is 30% or less, and if the difference in MTF for the center and the peripheral portion of the image forming surface of the lens unit 23 is 30% or less, a distinct image can be obtained. With respect to the MTF of a lens, even though there is some difference between the peripheral portion and the central portion is practically of no problem as a lens for use in a camera; however, in this invention, because a number of lens units 23 are integrated to make one frame of image, in one lens unit 23, the difference between the center and the periphery should be removed, and it is necessary to keep a good performance over the whole area. For this reason, it is proper to suppress the difference in MTF between the central portion and the peripheral portion within 30%. By doing this, a good image without unevenness can be obtained over the whole area of the display. In addition, MTF should be one for the spatial frequency corresponding to the pitch of pixels of the area sensor.

The half angle of view of the lens unit 23 is 35° or less, and by making the half angle of view of the lens unit 23 be 35° or less, the decrease of light quantity in the peripheral portion of the image to be formed by the lens unit 23 is small, which makes it possible to raise further the sensitivity of the detector.

The area sensor 24 is made up of a solid state image sensor such as a CCD or a CMOS sensor, and by using a solid state image sensor such as a CCD or a CMOS sensor for the area sensor, a distinct image can be obtained.

In the image capturing apparatus of this invention shown in FIG. 1 to FIG. 3, it is carried out the calibration in which image data for correction (correction data) are obtained by obtaining signal values in the case of no application of radiation and in the case of uniform application of radiation without being transmitted through the object of image capturing.

Figure 4:
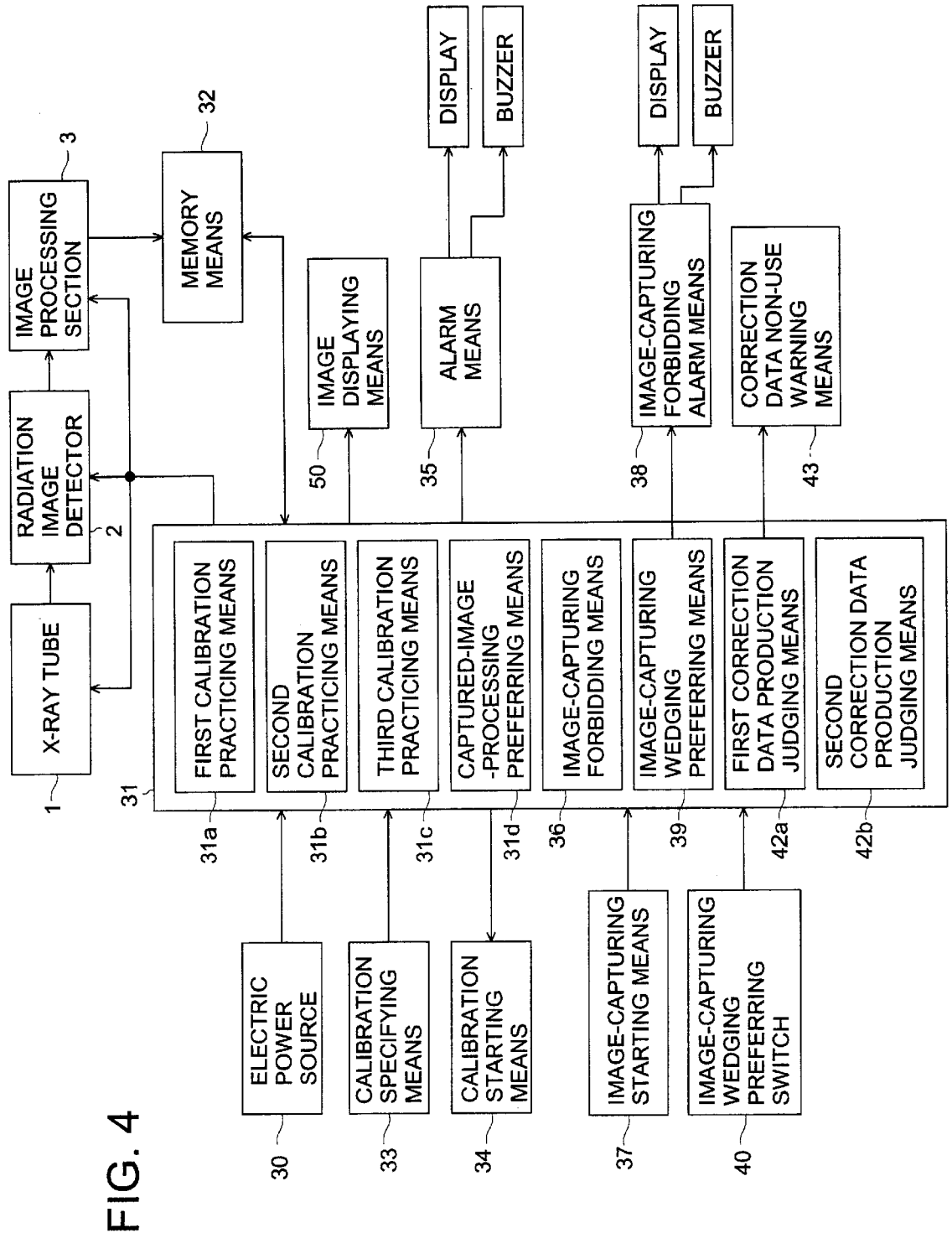
FIG. 4 is a drawing showing the outline of the structure of a radiation image capturing apparatus which carries out calibration.

First, it will be explained the timing at which calibration is carried out. FIG. 4 is a drawing showing the outline of a radiation image capturing apparatus which carries out the calibration.

In the radiation image capturing apparatus, there are provided the X-ray tube 1, the radiation image detector 2, and the control means 31 for driving the image processing section 3, and this control means 31 comprises the first calibration practicing means 31a, the second calibration practicing means 31b, and the third calibration practicing means 31c, each of which carries out calibration; however, it is also appropriate that the control means 31 comprises at least one of these.

After a certain time has passed from the timing when the electric power source 30 is turned on to make the timer start counting, the first calibration practicing means 31a drives automatically the X-ray tube 1, the radiation image detector, and the image processing section 3 to carry out calibration, and it obtains the signal value from each of the pixels in the case of no application of radiation and that in the case of uniform application of radiation without being transmitted through the object, to obtain image data for correction (correction data), which are memorized in the memory means 32. By carrying out calibration automatically every time when the electric power source 30 is turned on, the apparatus has a high reliability, and the resolution of an image can be easily raised.

After a specified certain time has past with a timer counting from the former calibration while the electric power source is kept turned on, the second calibration practicing means 31*b* drives automatically the X-ray tube 1, the radiation image detector, and the image processing section 3 to carry out calibration, and it obtains the signal values from each of the pixels in the case of no application of radiation and that in the case of uniform application of radiation without being transmitted through the object, to obtain image data for correction (correction data), which are memorized in the memory means 32. By carrying out calibration automatically after a specified certain time has passed with the timer counting from the former calibration while the electric power source is kept turned on, the apparatus has a high reliability, and the resolution of an image can be easily raised.

When the number of times of image capturing counted by a counter from the former calibration reaches the specified number of times, the third calibration practicing means 31*c* drives automatically the X-ray tube 1, the radiation image detector, and the image processing section 3 to carry out calibration, and it obtains the signal values from each of the pixels for the case of no application of radiation and for the case of uniform application of radiation without being transmitted through the object, to obtain image data for correction (correction data), which are memorized in the memory means 32. By carrying out calibration automatically when the number of times of sensing counted by the counter from the former calibration reaches the specified number of times, the apparatus has a high reliability, and the resolution of an image can be easily raised.

Further, the radiation image capturing apparatus comprises the calibration specifying means 33; by this calibration specifying means 33, the method and/or timing of calibration can be specified, and an operator can vary the method and/or timing of calibration arbitrarily, for example, in accordance with the operational condition of the radiation image capturing apparatus.

The control means 31 comprises the captured-image-processing preferring means 31*d*, and in this captured-image-processing preferring means 31*d*, in the case where the image capturing for the object of image capturing 60 or the captured-image-processing in the image processing section 3 has already been started at the planned time for calibration with the X-ray tube 1, the radiation image detector 2, and the image processing section 3 driven, calibration is carried out after the image capturing or captured-image-processing is completed, to prefer the image capturing for the object of image capturing or the captured-image-processing in the image processing section 3 to calibration. The apparatus can cope with the case where, for example, for an urgent reason or the like the image capturing for the object of image capturing 60 or the captured-image-processing in the image processing section should be immediately done preferentially.

Further, the radiation image capturing apparatus comprises the calibration starting means 34 for starting calibration at an arbitrary timing, and for example, the calibration starting means 34 is made up of a switch or the like. By operating the calibration starting means 34, an operator can start calibration at an arbitrary timing, for example, in accordance with the operational condition of the radiation image capturing apparatus.

During calibration, the control means 31 issues the warning that calibration is in process by the alarm means 35. This alarm means 35 can notify that calibration is in process by a warning display or a buzzer etc.

Further, the control means 31 comprises the image capturing forbidding means 36, and by this image capturing forbidding means 36, during calibration, even though the image capturing start switch 37 is pressed, image capturing or captured-image-processing can be forbidden by driving the image capturing forbidding means 36.

Further, the radiation image capturing apparatus comprises the image capturing forbidding warning means 38, and during calibration, it is carried out by the image capturing forbidding warning means operated by the control means 31, the warning for forbidding the image capturing or the captured-image-processing during calibration. The warning made by this image capturing forbidding warning means 38 carries out the warning for forbidding the image capturing or captured-image-processing during calibration by a warning display or a buzzer etc., to make it possible not to carry out image capturing or captured-image-processing.

Further, in another embodiment of the invention, the control means 31 comprises the image capturing wedging preferring means 39, and when the image capturing wedging preferring switch 40 is operated, the image capturing wedging preferring means 39 is actuated, in the case where the request for image capturing or captured-image-processing is given during calibration, the calibration can be interrupted and the image capturing can be wedged into it. For example, in the case where it is necessary to carry out immediately, for an urgent deal, the image capturing for the object of image capturing 60 or the captured-image-processing in the image processing section 3 preferentially, by operating the image capturing wedging preferring switch 40, calibration is interrupted and the image capturing is wedged into it, and the correction data obtained immediately before it are used in the captured-image-processing.

In the following, the correction data obtained by calibration will be explained.

In the memory means 32 of this radiation image capturing apparatus, a plurality of sets of correction data which are obtained by calibration of plural times are memorized, and s suitable set of correction data can be selected for use at need. Further, by preferentially using the latest correction data in captured-image-processing, it is possible to make a correction and combination of images more precisely, and the resolution of an image can be easily raised.

By memorizing the correction data, which are renewed to include always the latest set of data, even though the information volume of the memorized correction data comes almost to the limit of the memory capacity of the memory means, the latest correction data are certainly memorized; therefore, the latest correction data can be made to be used in captured-image-processing. Further, because at least one of a set of correction data and a set of original image data together with a set of data after correction are memorized as a combination of sets of data, it is possible to approach the set of data after correction and at least one of the set of correction data used in correction and the set of original image data corresponding to them simply and certainly, which makes it possible for an operator to know the condition of the radiation image capturing apparatus at the time of image capturing simply and certainly.

Further, discriminating information for correction data and original image data which are mutually corresponding to each other are comprised as incidental information of data after correction, from which the correction data and the original image data mutually corresponding to each other can be discriminated simply and certainly, which makes it possible for an operator to know the condition of the radiation image capturing apparatus at the time of image capturing simply and certainly.

This control means 31 comprises the first correction data production judging means 42a, and it is judged by this first correction data production judging means 42a that correction data have been produced; if correction data have not been produced, a warning is given by the correction data non-use alarm means 43. By doing this, an operator can make calibration again by operating the calibration starting means 34.

Further, the control means 31 comprises the second correction data production judging means 42b, and it is judged by the second correction data production judging means 42b whether making a correction by the correction data is suitable or not; if the making of a correction is unsuitable, a warning is given by the correction data non-use warning means 43. In the case where correction data have not been produced for the reasons, for example, that the area sensors did not function at the time of calibration, that X-rays were not emitted, that correction data are not memorized in the memory means, or the like, a warning is issued, which makes it possible that calibration is carried out again.

The control means 31 is capable of outputting the image of at least one of correction data and original image data to the image display means 50; that is, the control means 31 is capable of outputting an image onto a sheet of the transparent type or reflection type by a laser exposure apparatus of the scanning type, an ink jet printer, or the like, or to a display device such as a CRT or a liquid crystal display, and an operator can know the condition of the radiation image capturing apparatus easily and certainly.

Further, the control means 31 is capable of outputting the image of at least one of correction data and original image data together with the image of data after correction onto a sheet of the transparent type or reflection type by a laser exposure apparatus of the scanning type, an ink jet printer, or the like, or to a display device such as a CRT or a liquid crystal display; therefore, an operator can know the condition of the radiation image capturing apparatus easily and certainly, and by referring to the both images for comparison, he can carry out more precise observation and diagnosis.

Further, it is possible to specify which is to be displayed, correction data, original image data, or data after correction by the control means 31, and by displaying on the image display means 50, it is possible for an operator to know the condition of the radiation image capturing apparatus easily and certainly. Further, for the data after correction, the information on the defective pixels detected by calibration can be displayed.

In this radiation image capturing apparatus, calibration can be made with a higher resolution than that in reading an image at the time of image capturing; for the geometrical corrections such as parallel shift, rotation, enlargement, reduction, and a correction of distortion, correction data having been produced with a higher resolution than that in reading an image are used. For the signal value corrections such as an offset correction and a gain correction, correction data, which have been produced using data for the number of pixels obtained by adding some pixels to those at the time of reading an image, can be used.

Further, the geometrical corrections are carried out after making signal value corrections; however, it is also possible that calibration is carried out in order to obtain correction data for carrying out signal value corrections only after making geometrical corrections, and using the data for signal value corrections obtained by the calibration, only signal value corrections is carried out.

In the case where geometrical corrections are corrections making affine transformations such as parallel shift, rotation, enlargement, and reduction after making a correction of distortion, and only signal value corrections are made as calibration, the signal value corrections are carried out after the geometrical corrections have been made using the latest correction data.

The calibration in this embodiment is carried out using a repetition pattern, and with a simple structure owing to the repetition pattern, precise correction data can be obtained.

Figure 5:
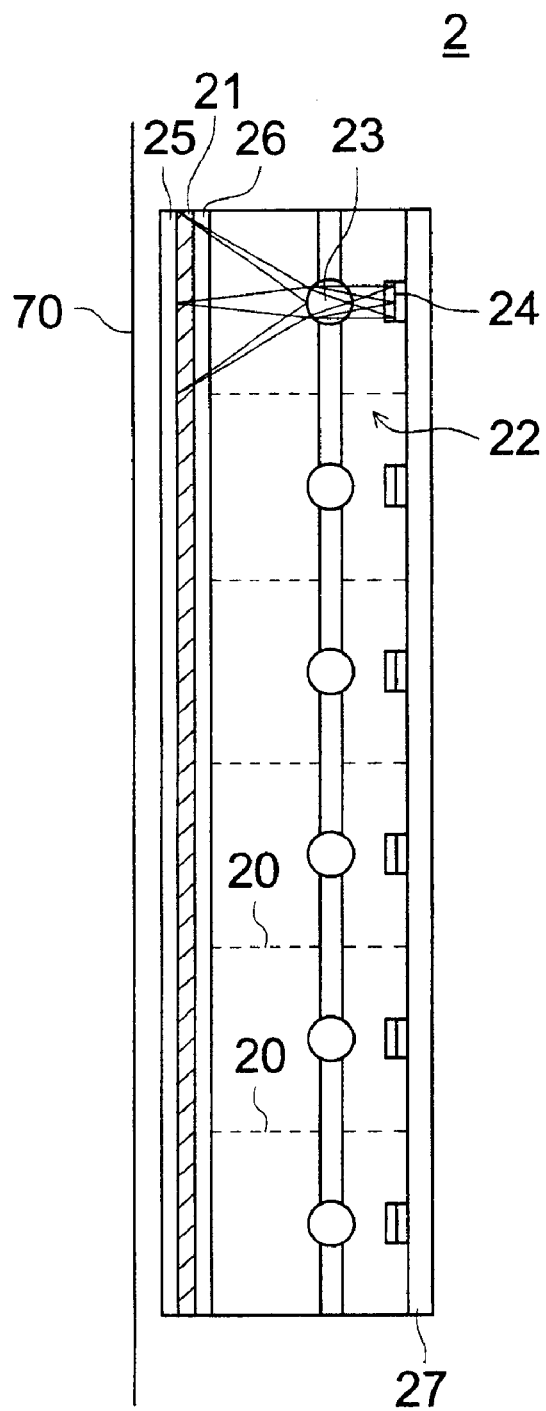
FIG. 5 is a schematic drawing of the longitudinal cross section of a radiation image detector showing the arrangement of a calibration chart.
Figure 6:
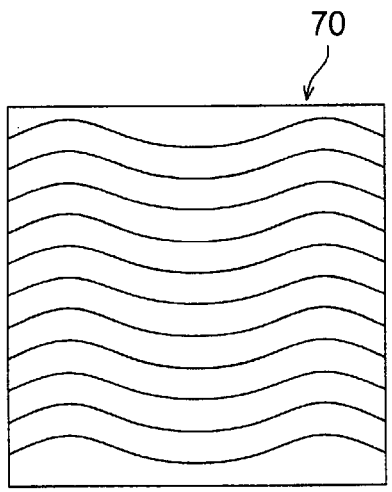
FIGS. 6(a) to 6(d) are plans showing several embodiments of a repetition pattern.
Figure 6:
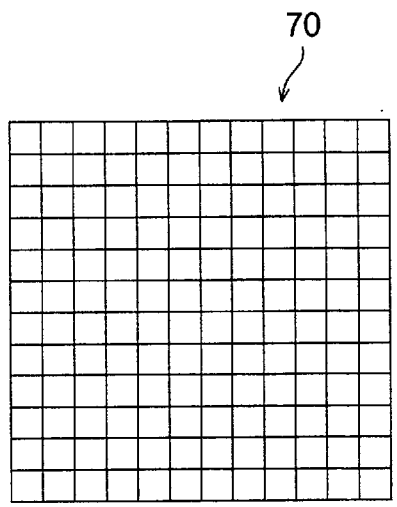
Figure 6:
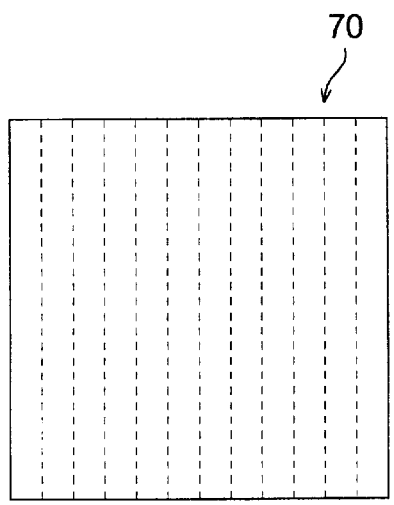
Figure 6:
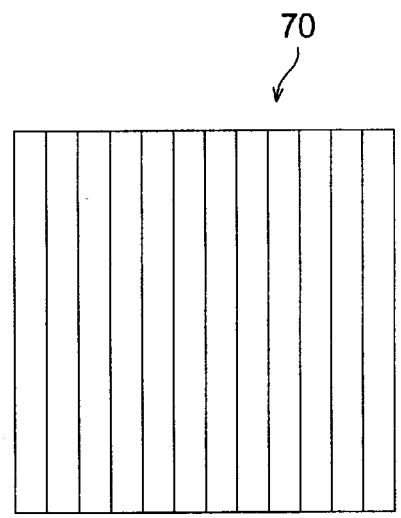

As shown in FIG. 5, the calibration is carried out using the repetition pattern 70 provided outside the sensor portion. For the repetition pattern 70, the repetition of wave-shaped curve as shown in FIG. 6(a) and mutually intersecting orthogonal straight lines to make a lattice-shaped pattern as shown in FIG. 6(b) can be used, but it is not limited to these examples. Further, as shown in FIG. 6(c), the repetition pattern 70 may be parallel dotted lines, or as shown in FIG. 6(d), it may be parallel straight lines. It is desirable that the repetition pattern 70 has approximately equal intervals because that makes it possible to obtain precise correction data. Further, it is desirable that the repetition pattern 70 corresponds to the arrangement of each of the area sensors 24, and correction data can be produced on the basis of the information from each of the area sensors 24.

As shown in FIG. 5, the repetition pattern 70 is disposed at the X-ray source side on the outer plane portion of the radiation image detector 2, and can make calibration over the whole of the radiation image detector 2. This repetition pattern 70 is made of an X-ray intercepting substance, and it is possible to obtain correction data from the precise and distinct repetition pattern 70.

Figure 7:
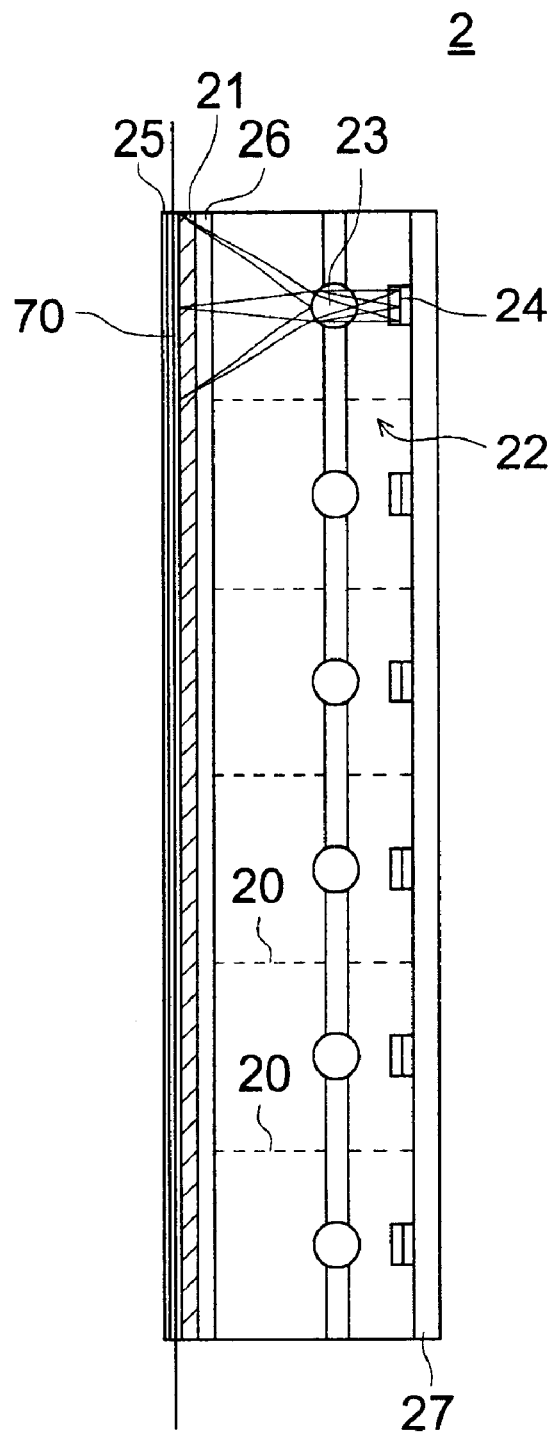
FIG. 7 is a schematic drawing of the longitudinal cross section of a radiation image detector showing the arrangement of a repetition pattern.

Further, as shown in FIG. 7, the repetition pattern 70 is disposed, being adjacent to the scintillator, on the reverse side to the area sensors 24 inside the radiation image detector 2, and can make calibration for the scintillator, the transparent member 26, the lens unit array 22, and the area sensors 24. This repetition pattern 70 is made of an X-ray intercepting substance, and it is possible to obtain correction data from the precise and distinct repetition pattern 70. Because the repetition pattern is provided inside the radiation image detector 2, it is easy to keep the positional relation to the lens units 23 and the area sensors 24 always in the same condition, and precise correction data with a high reproducibility can be obtained.

Figure 8:
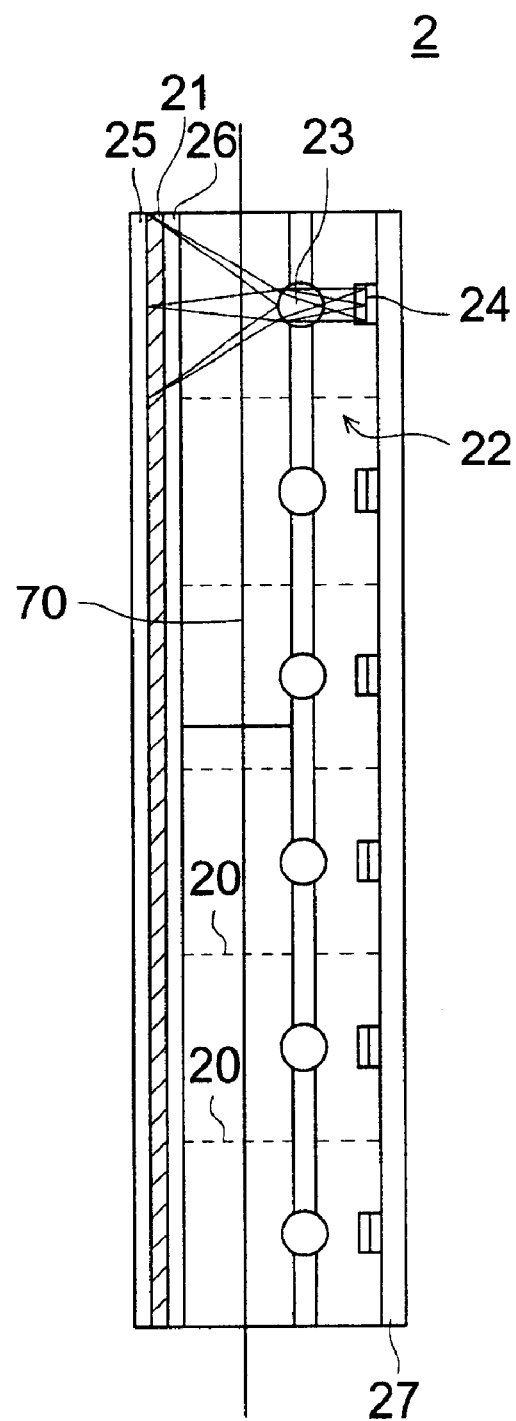
FIG. 8 is a schematic drawing of the longitudinal cross section of a radiation image detector showing the arrangement of a repetition pattern.

Further, as shown in FIG. 8, the repetition pattern 70 is disposed between the transparent member 26 and the lens unit array 22; because the repetition pattern is provided inside the radiation image detector 2, it is easy to keep the positional relation to the lens units 23 and the area sensors 24 always in the same condition, and precise correction data with a high reproducibility can be obtained.

Figure 9:
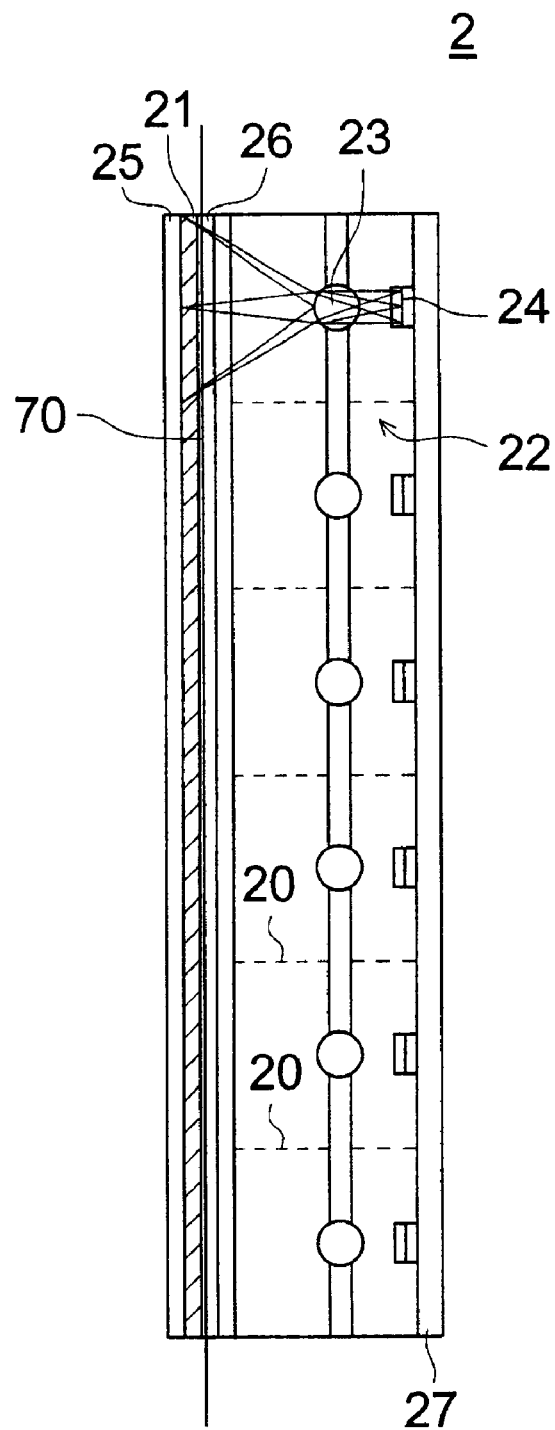
FIG. 9 is a schematic drawing of the longitudinal cross section of a radiation image detector showing the arrangement of a repetition pattern.

Further, as shown in FIG. 9, the repetition pattern is disposed on the surface of the scintillator 21 at the area sensor side; because the distinct image of the repetition pattern 70 produced by the fluorescence of the scintillator 21 can be utilized in calibration, more precise correction data can be obtained.

Figure 10:
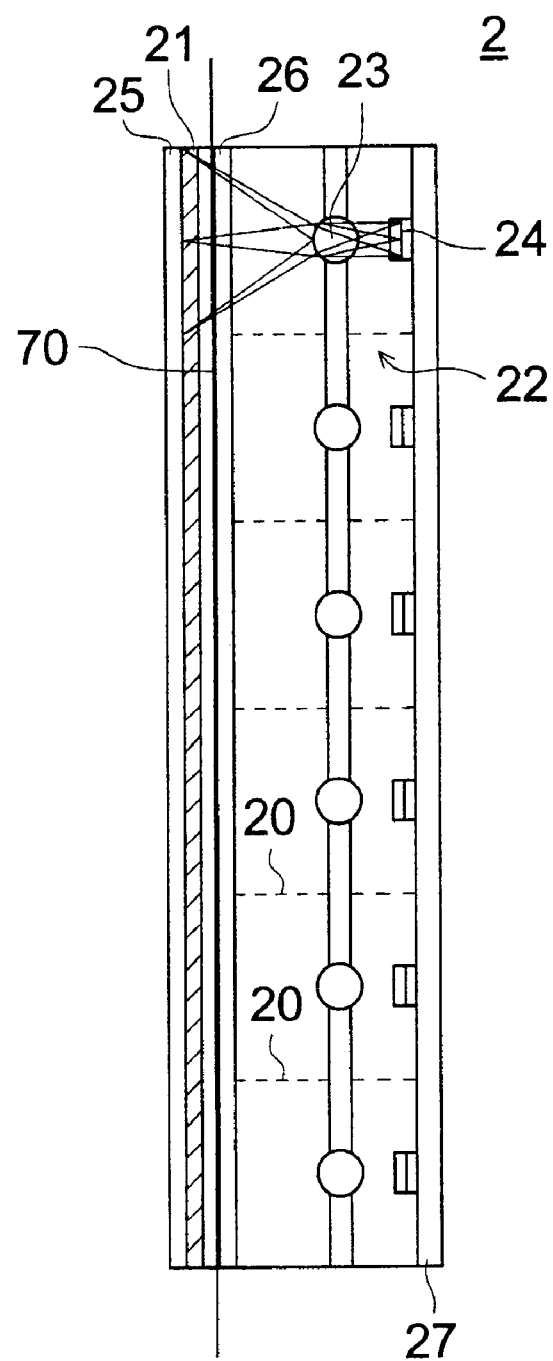
FIG. 10 is a schematic drawing of the longitudinal cross section of a radiation image detector showing the arrangement of a repetition pattern.

Further, as shown in FIG. 10, the repetition pattern 70 is disposed on the surface at the scintillator side of the transparent member 26, which is arranged between the scintillator 21 and the area sensors 24; because the distinct image of the repetition pattern 70 produced by the fluorescence of the scintillator 21 can be utilized in calibration, more precise correction data can be obtained.

This transparent member 26 is a glass plate, and the repetition pattern is formed of a light intercepting material. Because the transparent member 26 is a glass plate and is of low cost, and further, a glass plate has a high stiffness, precise correction data with a high reproducibility can be always obtained.

Figure 11:
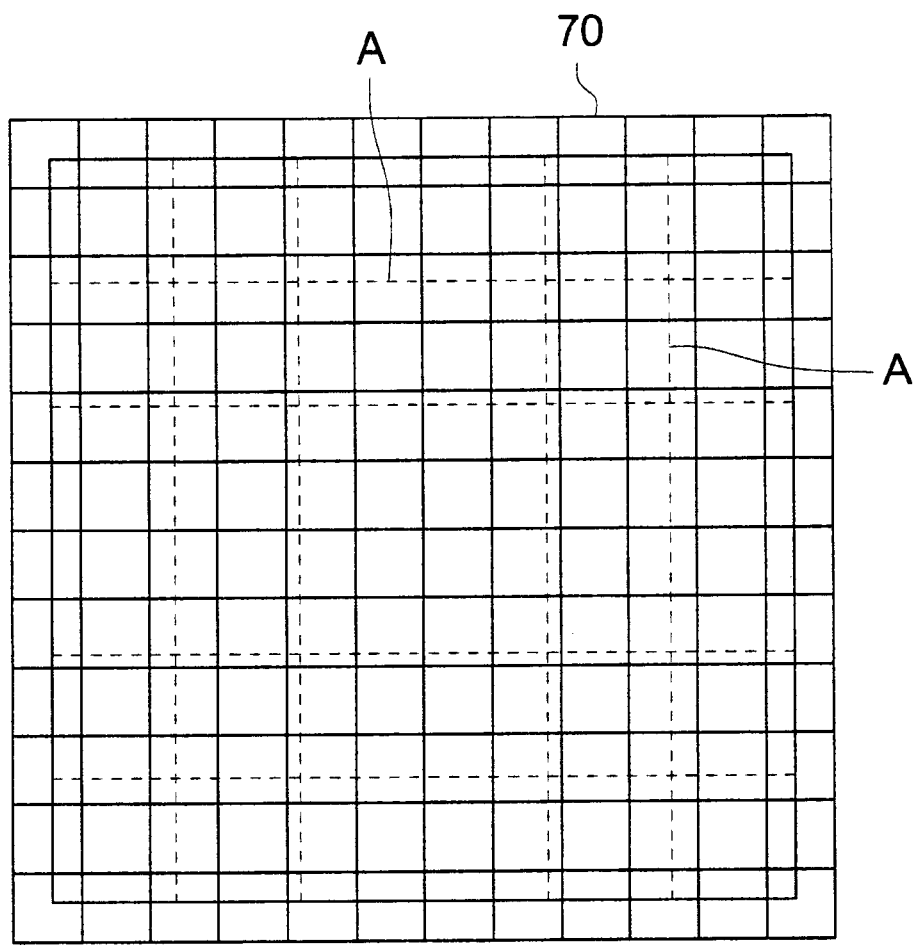
FIG. 11 is the plan of a radiation image detector showing the arrangement of a repetition pattern.

As shown in FIG. 11, at least a part of the repetition pattern 70 is positioned at the overlapping portion of the image capturing areas A of two neighboring area sensors to be captured commonly by both sensors, it is possible to know precisely the mutual positional relation of the two neighboring area sensors 24, and precise correction data for the overlapping portion of the image area can be obtained.

The line width of the repetition pattern 70 is 3 pixels or less on the final output image. In the case where the magnitude of the signal value of the pixels corresponding to the repetition pattern 70 is lowered to a half or less of the value for the no repetition pattern 70 being provided, the signal value of the pixels corresponding to the line or dot portion of the repetition pattern 70 is interpolated by using the information on the signal value of the surrounding pixels, and a correct image of an object of image capturing can be obtained.

Further, the repetition patterns 70 shown in FIG. 5 to FIG. 11 are capable of being attached and detached.

Figure 12:
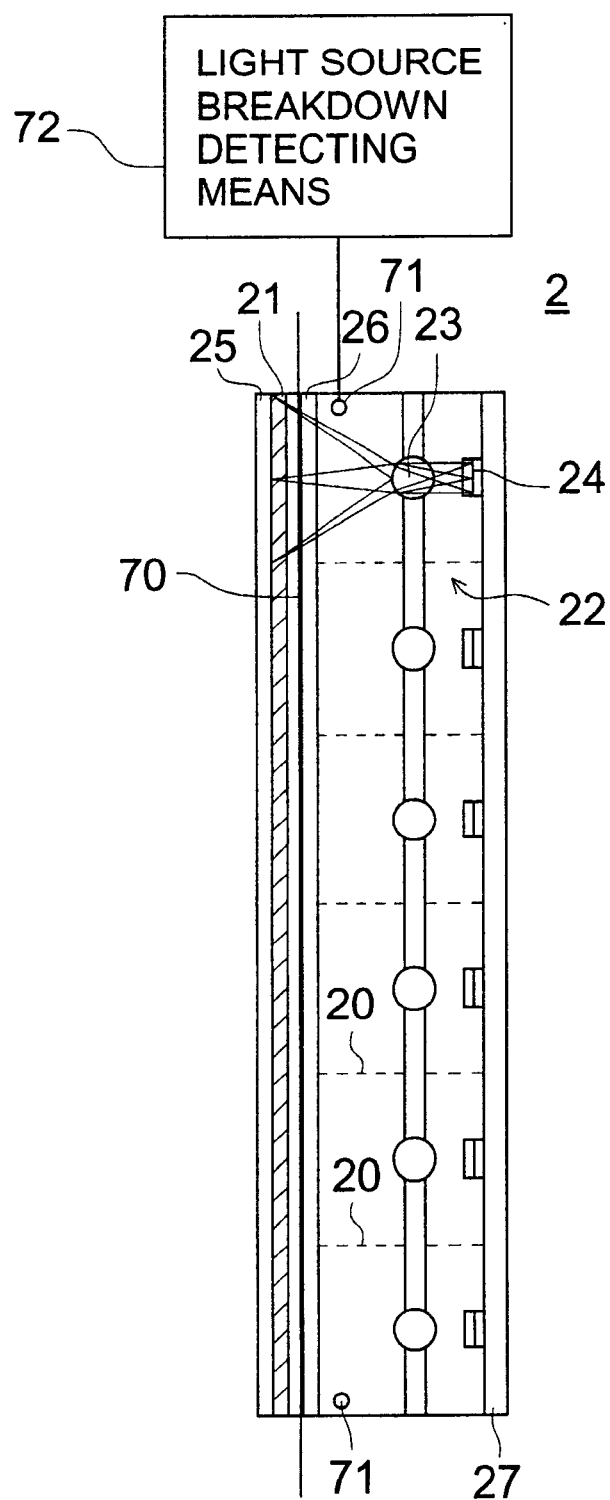
FIG. 12 is a schematic drawing of the longitudinal cross section of a radiation image detector showing the arrangement of a repetition pattern.

Further, as shown in FIG. 12, by providing the light source 71 inside the radiation image detector 2, and by tuning on the light source 71 at the time of calibration, it is possible to obtain precise correction data for geometrical corrections even without application of radiation.

The light source 71 is made up of a plurality of point light sources, and these point light sources are, for example, LED's. Because one or more of the point light sources are provided for each area sensor 24, while it is possible to make the detector small-sized and of light weight, a sufficient light quantity can be given to each of the area sensors 24 certainly; therefore, precise correction data can be obtained.

The light from the light source 71 irradiates the both side surfaces of the transparent member 26 placed between the scintillator 21 and the area sensors 24, and the light is transmitted through the transparent member to make it possible to illuminate a wide range; therefore, precise correction data can be obtained.

In the case where this transparent member 26 is a diffuser plate, it is possible, at the time of calibration, to make the light diffuse to a wide range; therefore, precise correction data can be obtained. Further, because the transparent member is capable of being attached and detached, by detaching the diffuser plate at the time of image capturing, a distinct radiation image can be obtained.

Further, if the light from the light source 71 is infrared rays, and the repetition pattern is formed of a member which reflects or absorbs infrared rays and transmits visible light, it is possible to obtain a radiation image appearing as fluorescence from the scintillator 21 without being influenced by the repetition pattern.

Further, if the light source breakdown detecting means 72 is provided and detects the breakdown of the light source 71, to display it or to issue a warning, the possibility of the breakdown of the light source during calibration is made extremely small. It is possible to make the light source breakdown detecting means 72 have such a structure as to detect the breakdown of the light source at the time of actuating the electric power source.

In the following, it will be explained an example of practice in which the positional deviation of a pixel produced by the optical distortion generated by the lens unit and the positional deviation of the area sensor is corrected by using a calibration chart as the repetition pattern.

Figure 14:
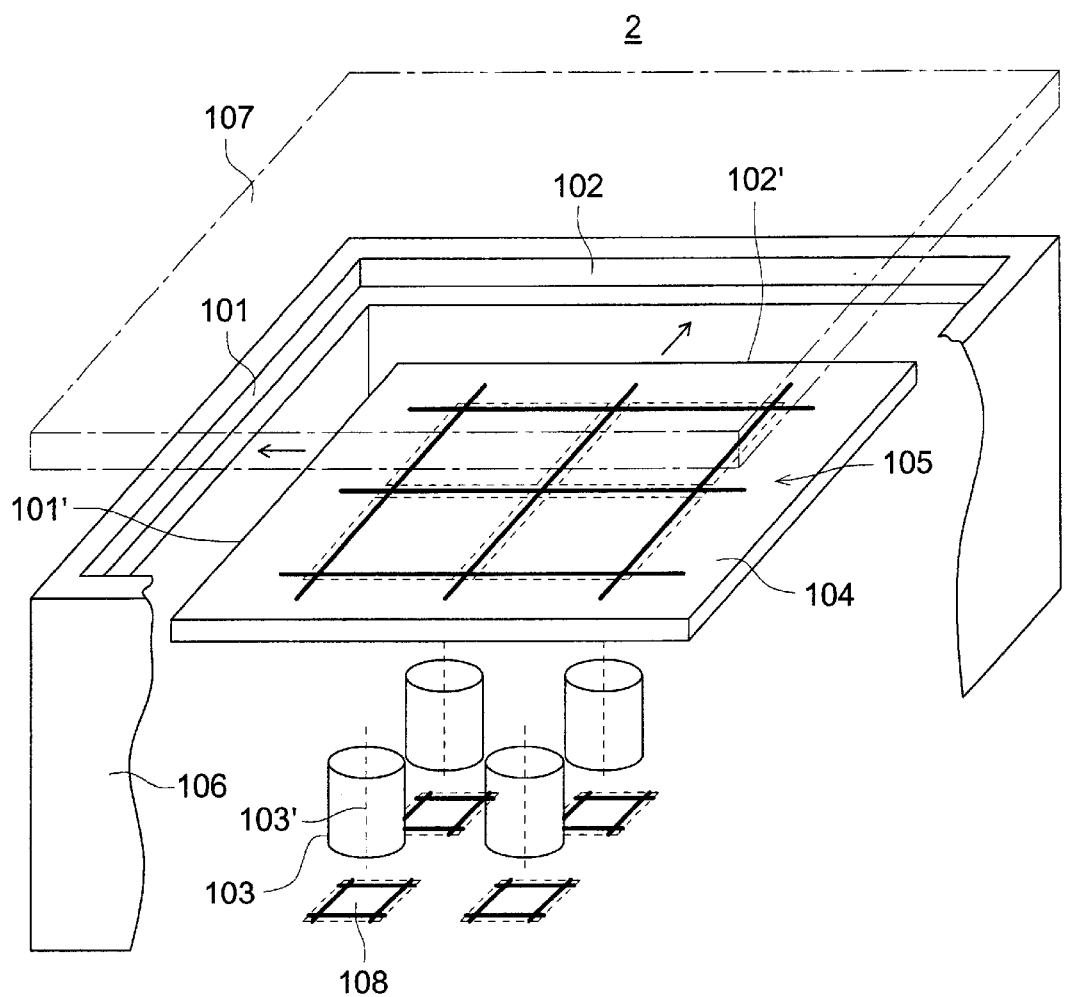
FIG. 14 is a drawing showing the outline of the arrangement of a calibration chart, every lens unit, and every area sensor.

The radiation image detector 2 has such a structure as shown in FIG. 14. In the radiation image detector 2, the transparent supporting member 104 is provided, and the lattice-shaped calibration chart 105 is drawn on the surface of this supporting member 104. For the supporting member 104, a transparent planer plate such as a glass plate, or a plastic plate is used. The supporting member 104 has the basic planes of size 101' and 102', and the sizes from this basic planes of size 101' and 102' to the lattice of the calibration chart 105 are drawn with a specified precision.

The supporting member 104 is placed in the housing 106 from the upper direction in FIG. 14, and by making the supporting member 104 come into close contact with the basic planes 101 and 102 which are provided to correspond to the basic planes of size 101' and 102' of the supporting member 104, it is possible to control the sizes from the basic planes 101 and 102 of the housing 106 to the lattice of the calibration chart 105 with a specified precision.

Further, the housing 106 has a structure for fitting every lens unit 103, and is made up in a manner such that the distance from the basic planes 101 and 102 to the optical axis 103' of every lens unit (represented by one lens unit 103) can be obtained with a specified precision.

This can be accomplished, for example, by controlling the feed size in the machine tool in working the round hole for fitting the lens unit 103 into the housing 106. After bringing the supporting member 104 into close contact with the basic planes 101 and 102 of the housing 106, a fixing process such as pressing from the reverse side and holding fast by a rubber member and screws is practiced, and after that, the scintillator 107 may be placed from the upper side in such a manner as to be brought into close contact with the supporting member 104.

A radiation image is formed by converting X-rays into visible light by the scintillator 107, and further converting the visible light obtained by the conversion into an electrical signal through the lens unit 103 or its array by the area sensor 108 which is arranged at the position corresponding to the lens unit 103.

Because distortion owing to the distortion aberration by the lens unit 103, the deviation of reducing magnification owing to the manufacturing error of the lens unit 103, positional deviation in the horizontal direction (direction perpendicular to the optical axis) owing to the attaching error of the area sensor 108, etc. are included in the image (pixel) formed on the area sensor 108, it is necessary to carry out a positional correction by image processing in order to obtain a correct image. Among the above-described, the positional deviation owing to distortion appears in a symmetrical form with respect to the optical axis 103' of the lens unit; therefore, in order to make positional correction, it is necessary to obtain the position of the point corresponding to the optical axis of the lens unit 103 in the image on the area sensor 108. It is easy if the above-described position can be obtained on the basis of the mechanical accuracy from the package of the area sensor 108; however, because there is usually a manufacturing error of the level of several tens of pixels in the position of the sensing area with respect to the package made as the basis, it is difficult to adopt this method.

To state another method, the specified calibration chart 105 is placed on the surface of the scintillator or a position equivalent to it, and from the image of this calibration chart 105, the position of the point corresponding to the optical axis 103' of the lens unit is calculated. In this case also, it is necessary to make the point of correspondence to the optical axis of the lens unit on the calibration chart 105 coincide approximately with the optical axis 103' of the lens unit; however, because the adjustment of the position is done in the enlargement side of the lens in this case, it has the advantage that the required precision is not so strict as that in the adjustment of position done for the area sensor 108.

Therefore, in this invention, it is provided a basic plane for arranging the calibration chart 105 or the member on which it is drawn at the specified position with respect to the optical axis 103' of the lens unit, and the basic plane gives the basis of position in the plane perpendicular to the optical axis 103' of the lens unit.

Figure 15:
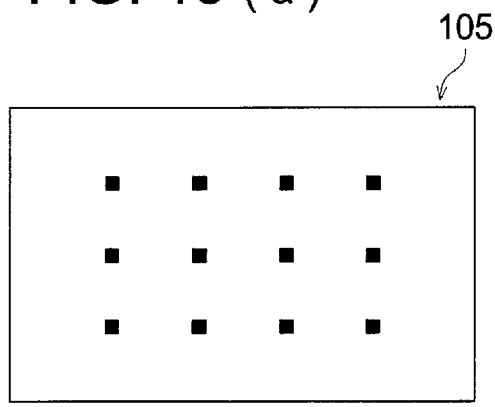
FIGS. 15(a) to 15(e) are drawings showing embodiments of a calibration chart.
Figure 15:
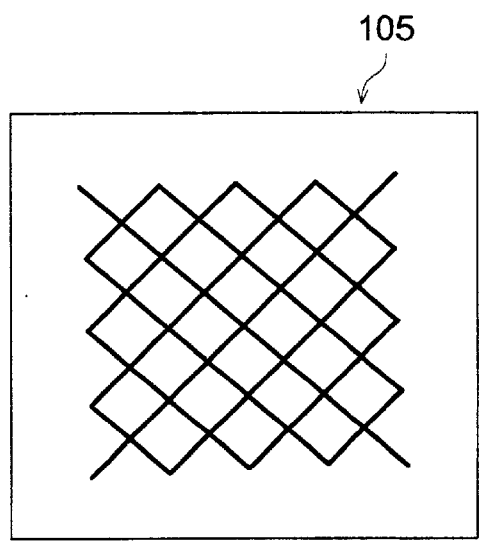
Figure 15:
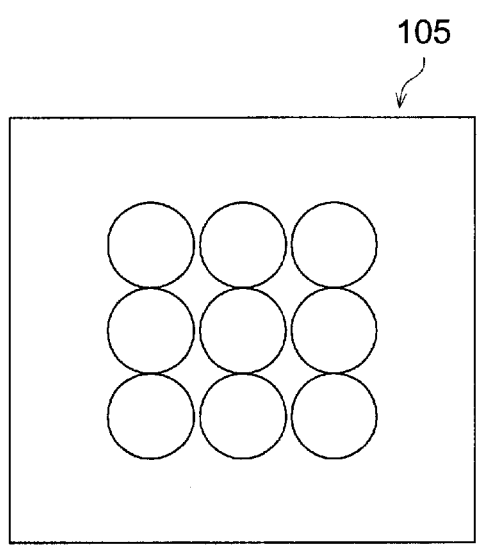
Figure 15:
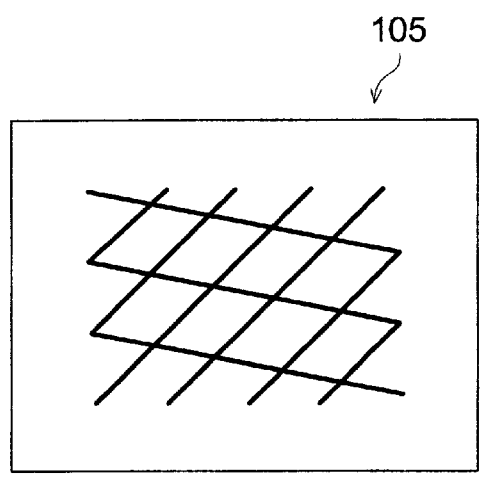
Figure 15:
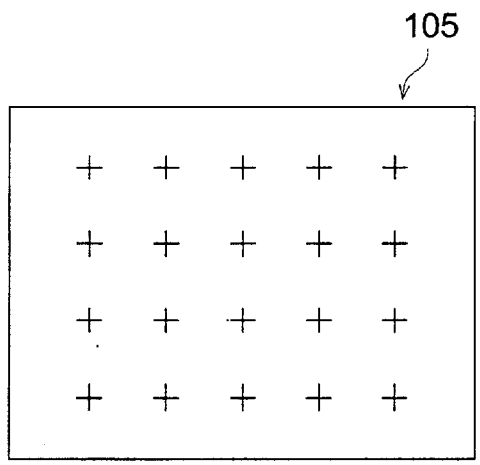

In this embodiment, a lattice is used for the calibration chart 105, but the calibration chart 105 is not limited to this, and as shown in FIG. 15(a), dots drawn at the positions corresponding to the intersecting points of a lattice may be appropriate; further, one having diagonals drawn as shown in FIG. 15(b), and one having circles drawn as shown in FIG. 15(c) are also appropriate. Furthermore, one having, for example, irregular diagonals drawn as shown in FIG. 15(d), and one having crosses drawn at the points corresponding to the intersecting points of a lattice as shown in FIG. 15(e) are also appropriate; any one having lines or dots of which the positional relation to the point of correspondence to the optical axis of the lens is known beforehand can be used for the calibration chart 105.

Further, it is appropriate to make out the calibration chart 105 in a manner such that the one period portion of the periodical structure in the calibration chart 105 corresponds to one of the area sensors 108, or it is also appropriate to make out it in a manner such that the portion of plural periods corresponds to one of the area sensors 108.

However, because the portion of the calibration chart 105 on which image is drawn intercepts the light from the scintillator 107, in the portion on which the image of the chart is formed, the information from the sensing object is screened. Accordingly, it is desirable that the ratio of the area occupied by the image of the calibration chart 105 to the area of the whole image is as small as possible. To state it concretely, it is desirable that the ratio of the area occupied by the image of the calibration chart 105 to the area of the whole image is 3% or less, and further, it is more desirable that the ratio is 1% or less.

In order to carry out the correction of the image from every sensor 108 precisely and at a high speed, in this embodiment, correction is carried out by a procedure described below.

Figure 13:
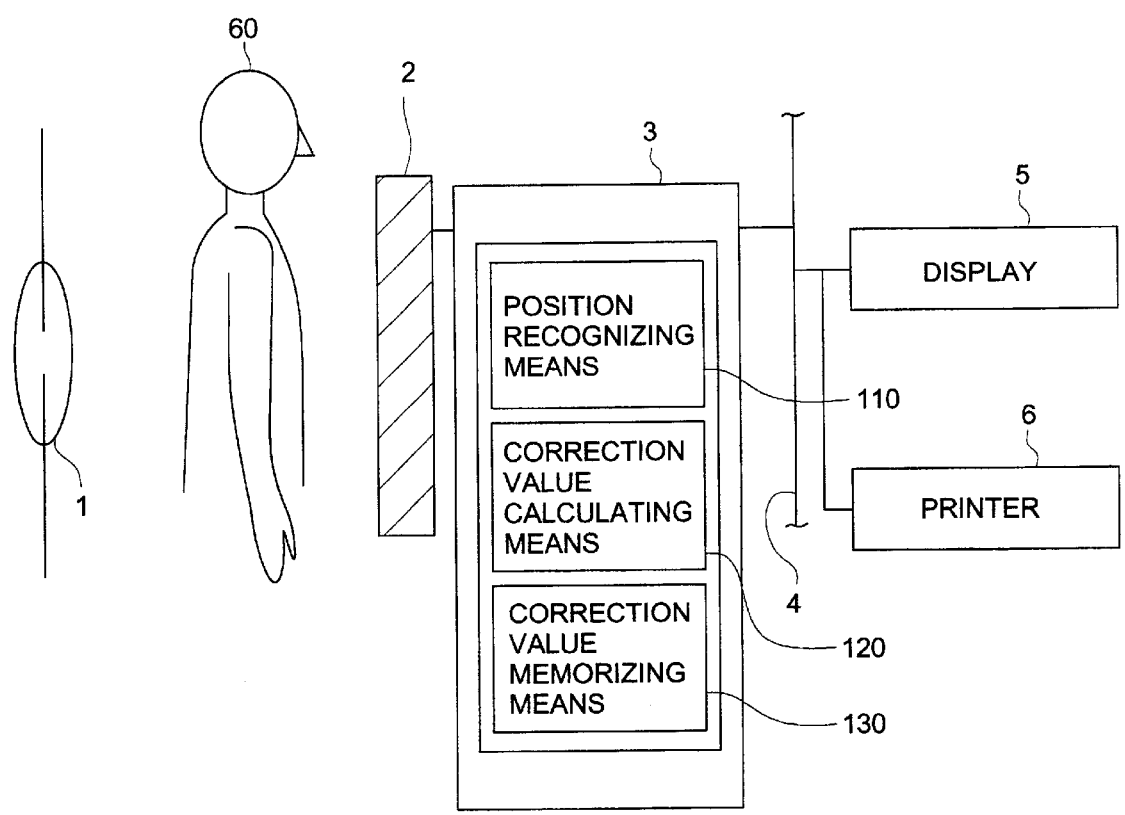
FIG. 13 is a drawing showing an example of practice of a system using a radiation image capturing apparatus.

First, in FIG. 13, with no object of image capturing 60 placed, the radiation generated by the radiation generating means is applied uniformly to the whole surface of the scintillator 107 of the radiation image detector 2. At this time, in the effective image area, the image obtained from each of the area sensors 108 comprised by the radiation image detector 2 becomes an image which has only the signal variation owing to the noise factors such as X-ray quantum mottle, photon quantum mottle, and an electrical noise; that is, an image having only the calibration chart 105 formed appearing in what is called a solid black image. This image is made to be an image for calibration.

The image of the calibration chart radiographed in the image for calibration is made to be a distorted image by the distortion aberration of the lens units 103. Further, owing to the positional deviation in the arrangement of the area sensors 108, the center of the image for calibration does not always coincide with the center of the image of the calibration chart.

Further, owing to the dispersion of the focal length of the lens units 103, the size of the image of the calibration chart also does not always coincide with the ideal size. A look-up table for transforming the position of the pixels in order that the image of the calibration chart formed appearing in this image for calibration may be located at the ideal position, and may have the ideal size and shape is to be made out.

The aforesaid image processing section 3 comprises the position correcting means 109, which calculates the necessary correction values with reference to the image of the calibration chart, to make out the look-up table.

As for the calculation of correction values, it is calculated by recognizing one or plural specified points on the calibration chart 105 by the position recognizing means 110, and obtaining the difference from the positions at which the specified points are to be properly located by the correction value calculating means 120.

In the case where the radiation image detector 2 comprises a plurality of lens units 103 and the area sensors 108, the position correcting means 109 calculates correction values for every area sensor. Further, as occasion demands, it is calculated the correction values of the signal level for the dispersion of sensitivity for every sensor 108, the lowering of the marginal light quantity of the lens units 103, and the dispersion of the signal level for every pixel resulted from the unevenness of the scintillator 107.

The look-up table which has been made out on the basis of the correction values calculated is memorized in the correction value memorizing means 130. Further, the look-up table which has been once calculated is kept memorized in the correction value memorizing means 130 so long as it becomes necessary to calculate it again for some reasons, and it never happens that the look-up table is re-calculated every time in ordinary radiographing in which the object of image capturing 60 is arrange to be captured.

In carrying out ordinary radiographing with the object of image capturing 60 arranged, the look-up table is read out from the correction value memorizing means 130, and the correction of position is made with reference to the look-up table for every pixel. Further, as occasion demands, the correction of signal level is made, to obtain a final image.

Figure 16:
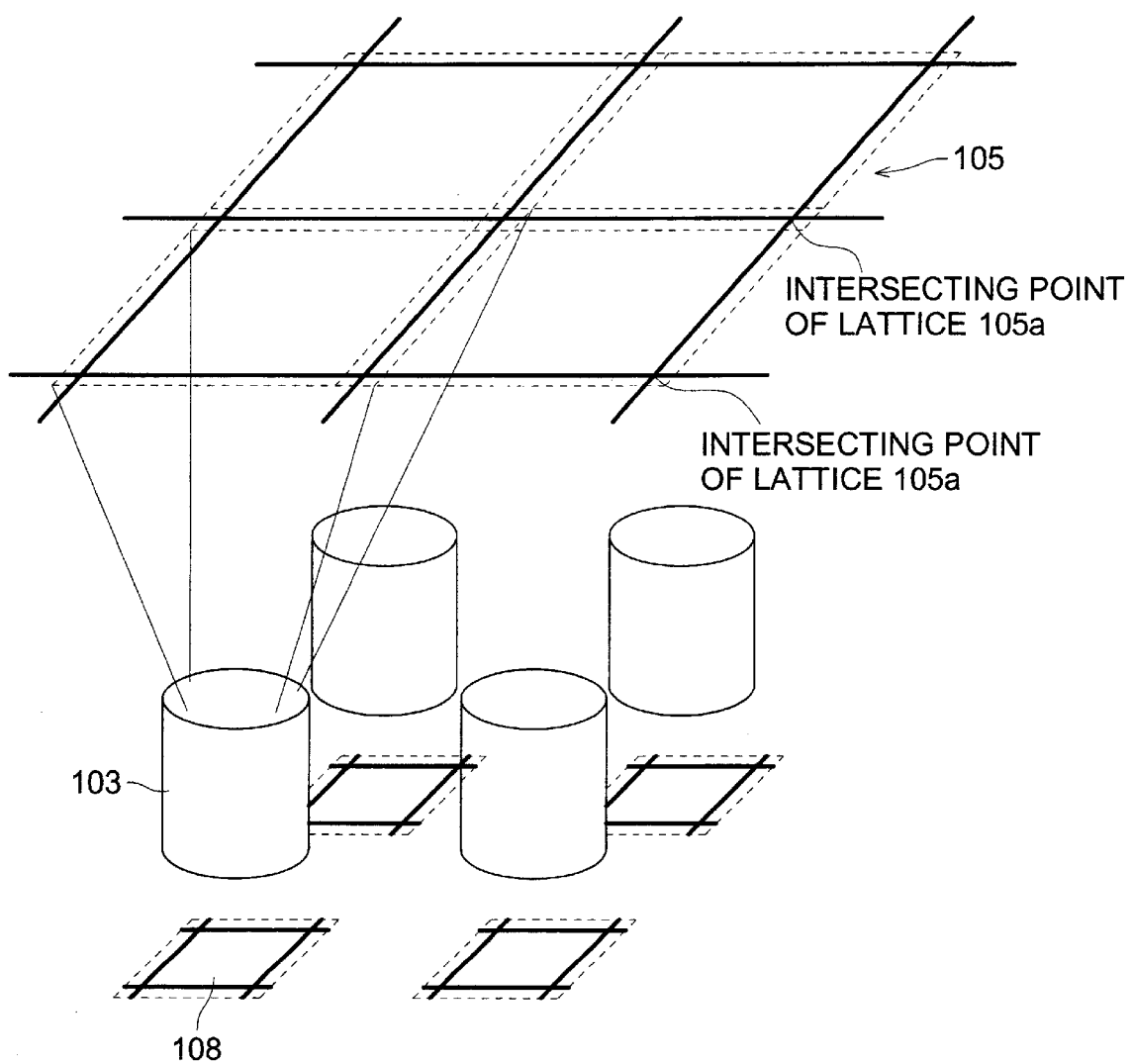
FIG. 16 is a drawing showing the outline of the arrangement of a calibration chart, every lens unit, and every area sensor in an embodiment.

In this embodiment, explanation will be given below on the premise that an image is obtained by converting visible light emitted from the scintillator 107 into an electrical signal by the plural lens units 103 and the area sensors 108 corresponding to the lens units, and for the calibration chart 105, a chart, which is lattice-shaped and point-symmetrical with respect to the point of correspondence to the optical axis of the lens unit 103 as shown in FIG. 16, is used. Further, in order that the mutually intersecting lines of the lattice drawn in the calibration chart 105 may be captured at the same time by two neighboring area sensors, the area to be captured by each of the area sensors 108 has an overlapping portion.

Further, for the calibration chart 105, also by using the one having crosses only at intersecting points 105a of the lattice shown in FIG. 15(e) instead of the ones shown in FIG. 16, it can be dealt with in completely the same way in the following embodiment.

Further, in this embodiment, it is assumed that the signal value of each pixel becomes higher with more application of radiation, and becomes lower with less application of radiation.

Figure 17:
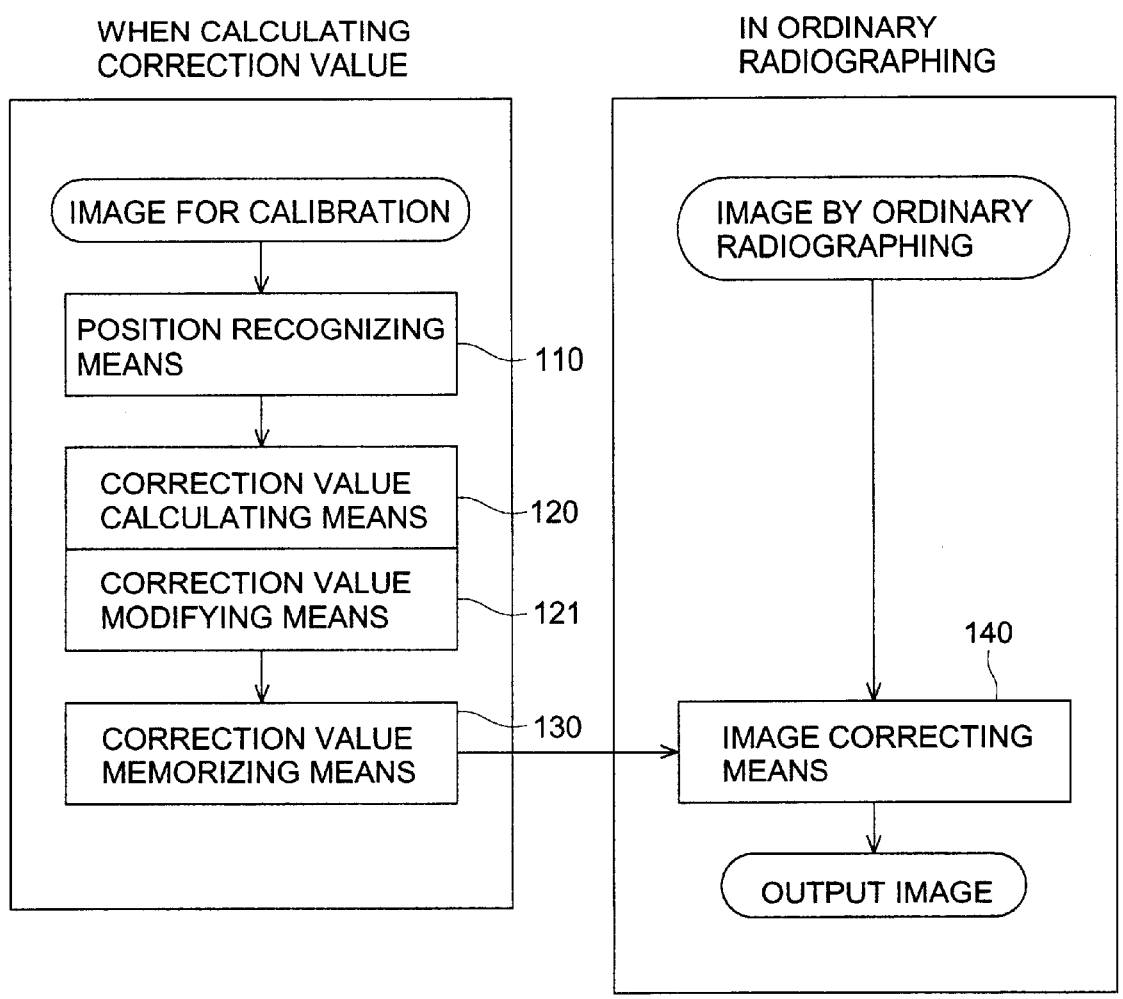
FIG. 17 is a flow chart of the procedure of practicing the correction of a position.

As shown in FIG. 17, the position correction means 109 comprises the position recognizing means 110 for recognizing the one or plural specified positions on the calibration chart 105, the correction value calculating means 120 for calculating the correction values on the basis of the positional information obtained by this position recognizing means 110, the correction value memorizing means 130 for memorizing the look-up table obtained by this correction value calculating means 120, and the image correction means 140 for reading out the look-up table from the correction value memorizing means 130 at the time of ordinary radiographing, correcting the image obtained by each of said area sensors 108 on the basis of the correction values, and combining the images obtained by all the area sensors 108, to finally make a single image.

In the following, the function of each of the above-mentioned means will be explained.

In the position recognizing means 110, for the above-mentioned specified positions, the four intersecting points 105a of the lattice drawn in the calibration chart 105 (refer to FIG. 16) are to be recognized. For that purpose, first, the image for calibration is binarized, and the pixels corresponding to the portion of the image of the calibration chart (namely, the image of the lattice) are extracted, and among the extracted pixels, the pixel which has the neighboring pixels positioned in the approximately horizontal direction and in the approximately vertical direction of it is recognized as an intersecting point of the lattice.

Figure 18:
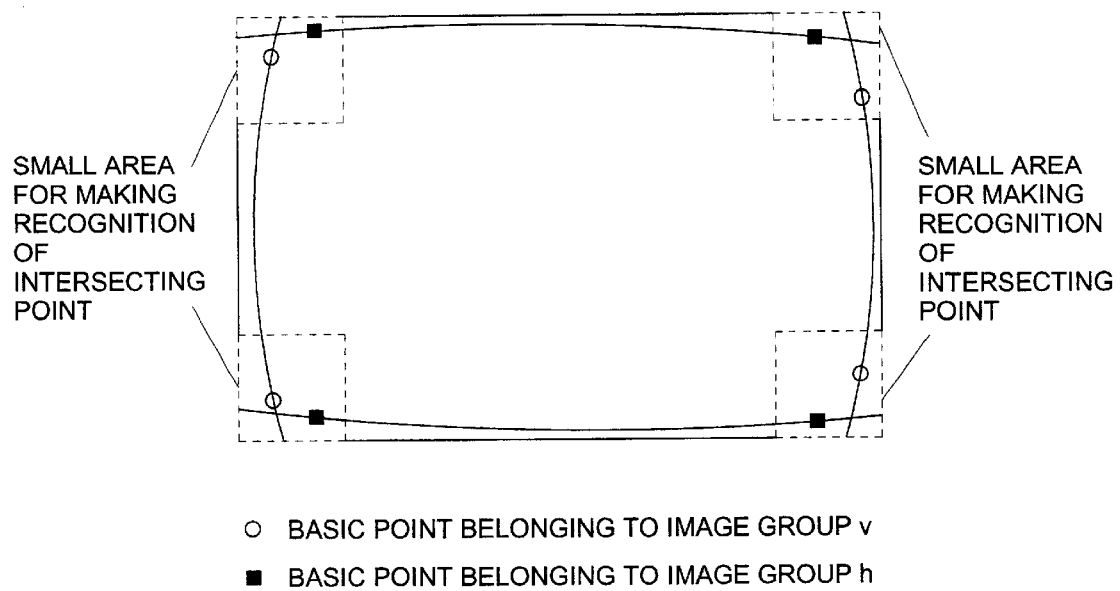
FIG. 18 is a drawing of outline showing the searching area for the specified points on the calibration chart to be recognized for the correction of a position.

For each of the four small areas in the neighborhood of the four corners of the image of the calibration chart, the small areas being considered as including an intersecting point of the lattice, the processing of binarizing and recognizing the intersecting point is carried out in the procedure shown below (FIG. 18).

As for binarizing, a cumulative histogram is made out for the signal values of the image of the calibration chart. Next, on the basis of the cumulative histogram, the signal value, at which the number of frequency accumulated in the order from low to high signal value exceeds the specified number determined beforehand, is recognized as a threshold value. Because the ratio of area occupied by the above-mentioned lattice image to the whole image area is very small, it is desirable that this specified number is 0.01% to 5.0% of the total number of pixels included in the area for which the histogram is to be obtained.

Pixels having a signal value smaller than the threshold value are labeled as '1', and pixels having a signal value equal to or larger than the threshold value are labeled as '0'. That is, the pixels labeled as '1' correspond to the image of the lattice.

As another means of binarizing, there is such a method as described below.

Figure 19:
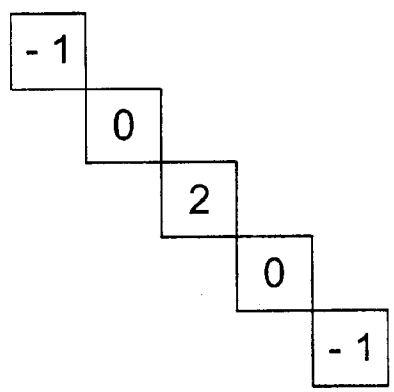
FIG. 19 is a drawing showing the shape of filters for use in obtaining the specified point on the calibration chart to be recognized for the correction of a position.
Figure 19:
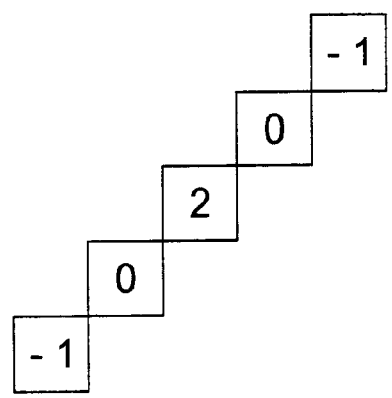

In the aforesaid image for calibration, the pixels corresponding to the image of the lattice are expected to have a lower signal value than the surrounding pixels (because the lattice intercepts the light emitted by the scintillator). Therefore, by using such a filter as shown in FIG. 19, the correlation value between the neighboring pixels equivalent to the second differential coefficient value is calculated.

Pixels having the absolute value of the above-described correlation value equal to or larger than a specified threshold value are labeled as '1', and pixels having the above-mentioned absolute value smaller than the threshold value are labeled as '0'. This threshold value may be determined to be a value supposed beforehand from the beginning, or it is also appropriate that the operation of the above-described correlation value between the neighboring pixels is carried out in the specified area, and a cumulative histogram is made out for the absolute value of the correlation value, and further in this cumulative histogram, the value, at which the number of frequency accumulated in the order from large to small absolute value of the correlation value exceeds the specified number, is determined to be the threshold value.

It is desirable that this specified number also is 0.01% to 5.0% of the total number of correlation operations for which the cumulative histogram is obtained, for the reason that the ratio of the number of pixels for the area occupied by the image of the aforesaid lattice to the total number of pixels of the whole image is very small.

The recognition of intersecting point is done in the procedure described below on the basis of the aforesaid labeling information.

For an arbitrary pixel of remark having the label '1' by the above-described labeling, it is counted the number of pixels out of the 48 pixels in its neighborhood having label '1' by the above-described labeling.

Figure 20:
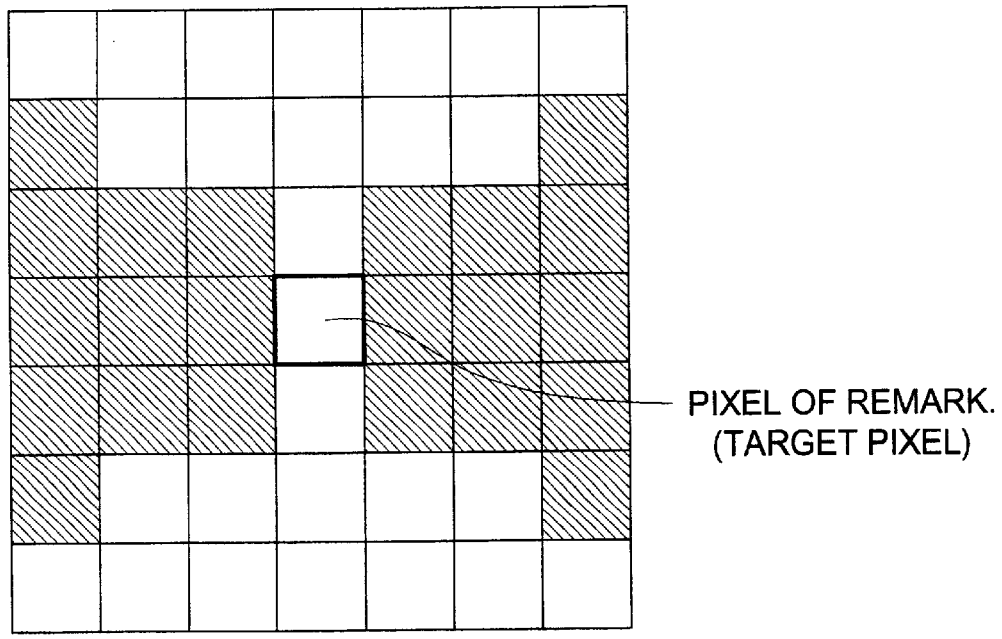
FIGS. 20(a) and 20(b) are drawings of outline showing the area in which the pixels exist representing the image of the calibration chart for use in obtaining the specified point on the calibration chart to be recognized for the correction of a position.
Figure 20:
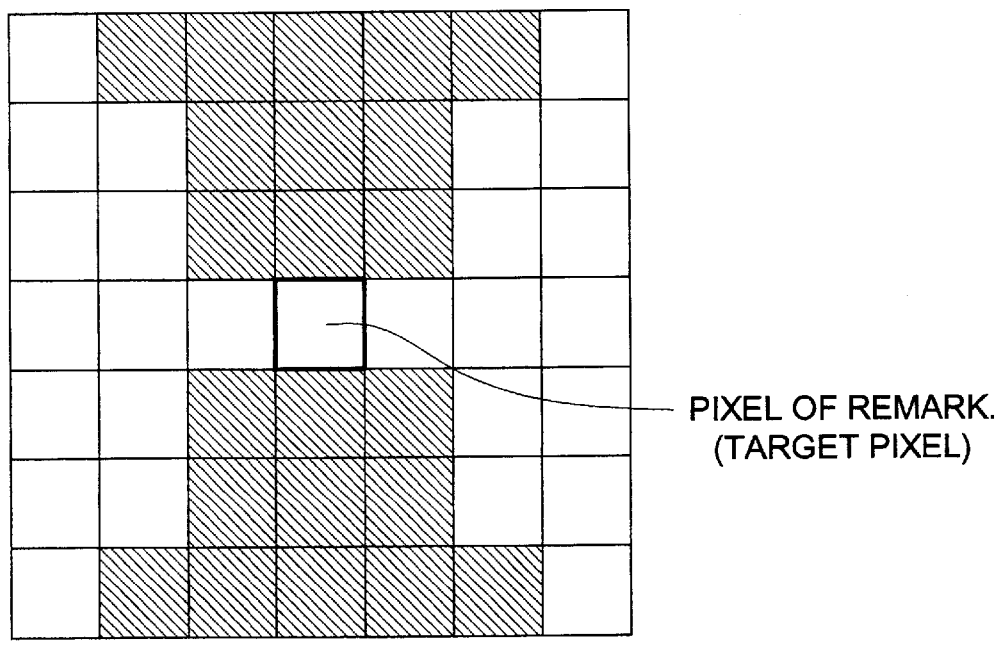

At that time, it is recognized as the suitable pixel for the intersecting point of the lattice, the above-described pixel of remark around which one or more pixels having the label '1' are included in the area located in the horizontal direction from it shown by the oblique lines in FIG. 20(a) and one or more pixels having the label '1' are included also in the area located in the vertical direction from it shown by the oblique lines in FIG. 20(b), further, the number of the above-described count for said pixel of remark being the largest.

It is obtained the center of gravity of the pixels having the label '1' by the aforesaid labeling included in the 24 neighboring pixels or 48 neighboring pixels of the above-described pixel suitable for the intersecting point, and it is recognized as the intersecting point of the lattice, a pixel which has the label '1' by the above-described labeling and is nearest to the center of gravity.

From the position of the intersecting point of the image of the lattice in the calibration chart 105 recognized by the position recognizing means 110, the required correction values are calculated by the correction value calculating means 120, to make out a look-up table. For the items to be corrected, the following are cited.

a) Amount of parallel shift, b) Amount of rotation (up to this, the item resulted from the positional deviation of the arrangement of the area sensor), c) Magnification, and d) Distortion aberration (up to this, the item resulted from the characteristics of the lens unit).

In the following, the procedure of the calculation of each of the correction values will be explained.

First, the central position of the image of the calibration chart is detected. Because this central position is expected to be located in the neighborhood of the point corresponding to the optical axis of the lens unit 103, it is possible to obtain the amount of parallel shift and the correction value of the distortion aberration with the co-ordinates of the central position made as the basis.

Figure 21:
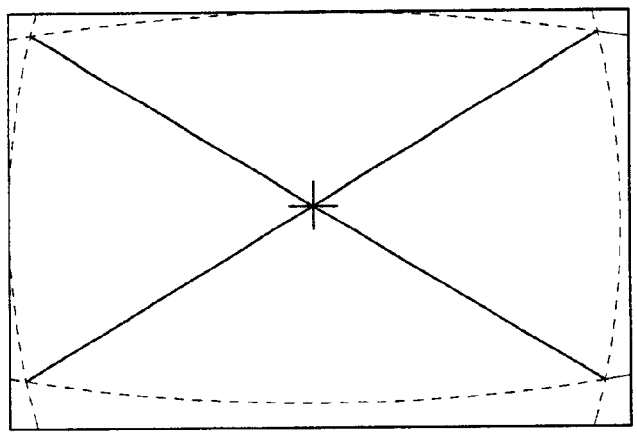
FIGS. 21(a) and 21(b) are drawing for explaining the reference point and the rotation angle to be used in calculating the amount of shift and the amount of rotation of an image resulted from the positional deviation of the area sensor.
Figure 21:
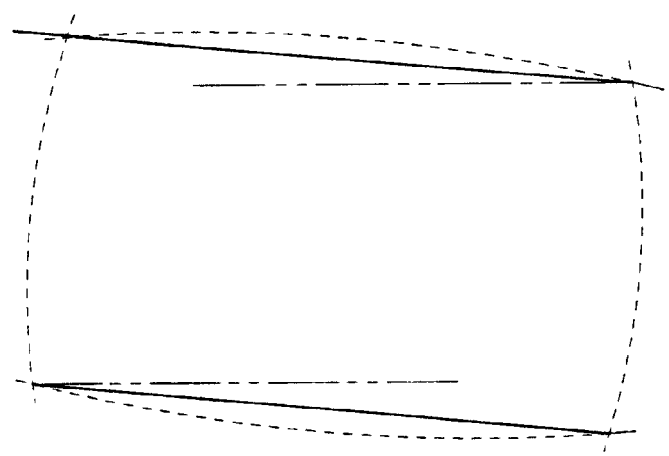

Two straight lines each of which passes the pair of intersecting points located at the diagonal positions among the above-described 4 intersecting points are obtained (FIG. 21(a)).

The intersecting point of the above-mentioned two straight lines is detected as the center of the image of the calibration chart.

The reason why the center of the image of the calibration chart can be detected by the above-described method is because the calibration chart 105 and the lens unit 103 corresponding to it are arranged physically with almost no positional deviation, therefore it is proper to consider the distances from said central position of the image of the calibration chart to said intersecting points equal to one another, and every intersecting point is subjected to the distortion by an equal amount owing to the distortion aberration of the lens unit 103.

As for the calculation of the amount of parallel shift, it is made the amount of parallel shift, the deviation in terms of the co-ordinates between the central position of the image of the lattice obtained in the above and the predetermined central position of the image which should be obtained by every area sensor 108.

As for the calculation of the amount of rotation, each of the two straight lines passing the pair of intersecting points located at the positions neighboring approximately in the horizontal direction among the aforesaid 4 intersecting points is obtained (FIG. 21(b)).

From the average value of the tilts of the straight lines obtained by the above-described procedure, its arc-tangent is calculated to be made the amount of rotation (radian or degree).

As for the calculation of the magnification, it is very difficult to manufacture a number of lens units in a manner such that all of them have perfectly the same focal length. Accordingly, the images of the area sensors 108 come to have a size minutely different from one another owing to the difference in the focal length resulted from the dispersion in manufacturing the lens units 103.

In order to combine images from a number of area sensors 108 to make a single image giving no feeling of disorder, it is necessary to make the size of the aforesaid image of every area sensor 108 constant. Therefore, for the image of every area sensor 108, by calculating the magnification compared with the size of the ideal image and taking it into consideration at the time of the correction, combination of images giving no feeling of disorder can be carried out.

In the case where the distortion aberration of the lens unit 103 concerned can be considered small, the magnification m is calculated in the following procedure.

The average value lav of the two values of distance between the pair of intersecting points located at diagonal positions is obtained.

From the aforesaid average distance lav and the distance lid between the pair of intersecting points located at the diagonal positions of the calibration chart 105 in the case where the lens unit 103 concerned is manufactured ideally and arranged in a optimum condition, the magnification mag is calculated by the following expression:

$$mag = lav/lid \qquad (1).$$

As for the correction of the distortion aberration, the distortion of an image owing to the distortion aberration does not become a uniform amount for each of the pixels, and varies depending on the distance from the optical axis of the lens unit 103 concerned. Accordingly, it is necessary to obtain the correction value for each of the pixels.

The correction value d is calculated for an arbitrary pixel in the following procedure.

A table noting the correspondence between the distance of the image on the area sensor 108 from the optical axis for a lens unit being assembled ideally and the amount of variation of the distance owing to the distortion aberration is to be made out beforehand, and the table of correspondence is memorized as the data of the amount of the distortion aberration.

For an arbitrary pixel, it is calculated the distance A from the center of the chart obtained in the above-described procedure (that is, the point corresponding to the pixel on the optical axis of the concerned lens unit).

For the amount of variation of the distance owing to the distortion corresponding to the distance which is equivalent to the value obtained by dividing the above-described distance Δ by the aforesaid magnification mag, the correction value is read out from the aforesaid data of the amount of the distortion aberration. At this time, in the case where said distance does not exist in the data values noted in said data of the amount of the distortion aberration, the amount of the variation of the distance is obtained by interpolation or extrapolation at need, to make it the correction value.

By adding the above-described correction values, the co-ordinates after correction are obtained. Because distortion aberration usually varies the distance from the optical axis of the lens unit 103 in accordance with the distance from the optical axis of the lens unit 103 only, the above-described correction values are added to the direction in which only the distance from the optical axis of the lens unit 103 varies (in the case where positions are expressed by the polar co-ordinate system, in which the pixel corresponding to the optical axis of the lens unit 103 is made the origin, the parameter corresponding to the angle does not vary).

If the intersecting points of the lattice obtained by the position recognizing means 110 is really correct, a very precise positional correction can be made for each of the pixels by each of the correction values obtained in the above. However, in the case where some pixel other than the proper one is recognized as the intersecting point by an error, even though corrections are carried out on the basis of the above-described correction values, it is not possible to correct the position of every pixel properly.

In order that the above-described positional corrections may be made properly, each of the correction values is modified by the correction value modifying means 121. The modification of the correction values is made in the following procedure.

First, using each set of the above-described correction values, corrections are carried out for one or plural arbitrary pixels, to check whether corrections are made properly or not by comparing their positions with those after ideal corrections for evaluation. If some deviation is recognized, the correction values are modified by taking the amount of the deviation into consideration. Further, using the same or other pixels, the evaluation of the above-described correction values is made in the same way, and if some deviation of positions is still recognized, the correction values are further modified by taking the amount of the deviation into consideration.

In this way, by repeating the modification of the correction values until the amount of deviation comes to a certain value or less, it is possible to obtain a very high-precision correction values.

The concrete method of modifying the correction values in this embodiment will be explained in the following.

To state the determination of the basic points for carrying out the modification, the eight pixels (refer to FIG. 6), the sum of the four pixels (let them be the pixel group v) which are located apart from the intersecting points concerned obtained by the position recognizing means 110 by n pixels (n is desirably 3 to 50 or so) in the vertical direction on the line which is recognized as a line of the lattice respectively, and the four pixels (let them be the pixel group h) which are located apart from the above-mentioned intersecting points concerned by m pixels in the horizontal direction on the line which is recognized as a line of the lattice respectively, are made the basic points to be used in modifying the correction values.

As for the calculation of the amount of the deviation, with respect to each of the ideal transformed points in the case where the position of each of the basic points for which the modification of the correction values is to be carried out is ideally corrected, the points corresponding to them on the image for calibration concerned are obtained on the basis of each correction value obtained by the above-described procedure, and the amount of positional deviation between said basic points and said point of correspondence is calculated, to be utilized in the modification of said correction values.

In particular, with respect to the above-mentioned pixel group v, the co-ordinate values in the horizontal direction have a high reliability (because the possibility to recognizing a pixel which is not located on the line of the lattice as a pixel concerned by an error is low, and for the deviation on the line of the lattice, the horizontal co-ordinate values of said line of the lattice after modification are constant), and likewise with respect to the above-described pixel group h which are positioned apart from the above-mentioned intersecting points in the horizontal direction, the co-ordinate values in the vertical direction have a high reliability.

Therefore, for each of the pixels in the aforesaid pixel group v, the difference between the value of the horizontal co-ordinate after the position is corrected by the above-described correction values, and the value of the horizontal co-ordinate in the case where the position of each of the pixels is corrected ideally is calculated. In the same way, for each of the pixels in the aforesaid pixel group h, the difference between the value of the vertical co-ordinate after the position is corrected by the above-described correction values, and the value of the vertical co-ordinate in the case where the position of each of the pixels is corrected ideally is calculated.

For each of the ideal transformed points, when the point of correspondence on the image for calibration concerned is obtained on the basis of each of the correction values obtained in the above-described procedure, it is practiced with reference to the method which is described in making out the look-up table to be described later.

To state the evaluation function, the evaluation function E which can be obtained from the following functions is calculated on the basis of each of the amounts of the deviation obtained by the above-described calculation of the amount of the deviation. Until the value of this evaluation function comes to a value smaller than the specified threshold value Thd, the modification of the correction values is repeatedly practiced. When the value of the evaluation function E has come to a value smaller than the threshold value Thd, it is judged that the correction values have become proper, and the processing after that is practiced using these correction values.

Evaluation function:

$$E = \text{Max}(abs(\Delta v0), abs(\Delta v1), abs(\Delta v2), abs(\Delta v3)) + \text{Max}(abs(\Delta h0), abs(\Delta h1), abs(\Delta h2), abs(\Delta h3)) \quad (2),$$

$\Delta vi$ $\{i|i=0, 1, 2, 3\}$: the amount of deviation for the co-ordinate values in the horizontal direction obtained by the calculation of the amount of deviation for each pixel belonging to the pixel group v, $\Delta hi$ $\{i|=0, 1, 2, 3\}$: the amount of deviation for the co-ordinate values in the vertical direction obtained by the calculation of the amount of deviation for each pixel belonging to the pixel group h, abs( ): a function for calculating an absolute value, and Max (a, b, c, d): a function selecting out the maximum value out of $\{a, b, c, d\}$, and outputting it, where, it is desirable that the aforesaid threshold value Thd is 0.5 to 1.0 or so.

If the value of the Thd is smaller than 0.5, the modification of the correction values is difficult to converge, and more time than normally used becomes necessary for processing. Further, on the contrary, if it is larger than 1.0, the correction values do not come to proper values sufficiently, and in particular, in combining the images from the respective area sensors, the deviation of pixels occurs at the portion of combining, to produce an image unsuitable for diagnosis.

For modifying the correction values, first, using the correction values obtained, the corrections of position are carried out for each of the aforesaid pixels, to obtain the value of the above-described evaluation function E. Further, this value of the evaluation function E is compared with the minimum value Emin of the above-described evaluation function E which has been obtained before it. If the value of the evaluation function E is smaller than the above-mentioned Emin, Emin is substituted by E as Emin=E (when E is calculated for the first time, Emin is substituted by it unconditionally), and the correction values obtained at that time is temporarily memorized. In the case where the above-mentioned value of the evaluation function does not come under the above-described threshold value even after the modification of the correction values of the specified number of times, the correction values corresponding to this Emin are made the final correction values.

The modification of the correction values is carried out for each of the horizontal direction and the vertical direction with reference to the above-described $\Delta vi$ and $\Delta hi$ separately for each of the following cases.

i) Difference Between Maximun Value and Minimum Value of $\Delta vi$ is Smaller than 1 Pixel In this case, from the correction value mh of the parallel shift in the horizontal direction, the average value of $\Delta vi$ $\{i|i=0, 1, 2, 3\}$ or a value near the average is subtracted. In the case where the difference between the maximum value and the minimum value of $\Delta hi$ is smaller than 1 pixel, the similar processing is carried out (in this case, the correction value mv for the parallel shift in the vertical direction is modified).

ii) The Case Other than i) (Modification of Amount of Parallel Shift)

The average value of the values of deviation obtained from the two basic points positioned at the left side of the image, and the average value of the values of deviation obtained from the two basic points positioned at the right side of the image among the group of pixel v are obtained, and for one of the average values having the larger absolute value, from the correction value mh for the parallel shift in the horizontal direction, said average value or a value near the average value is subtracted.

(Modification of Magnification)

The half value of the difference between the average values obtained in the above procedure, is added to distance between the lattice line at the left side of the image and the lattice line at the right side of the image (the value when ideal positional corrections are made), and the value obtained through dividing the sum by said distance is made the modification value, by which the correction value of magnification mag is divided.

(Modification of the Amount of Rotation)

Next, in the case where the signs of the amount of the deviation is reverse to each other in one of the sets of basic points for each of which the above-described average value is obtained, the correction value of rotation rot will be modified. The amount of modification will be obtained in the following manner.

First, for each of the above-described sets, the difference between the amounts of the deviation is obtained, and further, the average value of the both differences is obtained. Next, in one of said sets, the distance in the up-and-down direction between said basic points located in the positions after ideal corrections respectively is obtained.

Then, the value of arc-tangent calculated through dividing the aforesaid average value of the differences by the aforesaid distance is made the modification value. Finally, the obtained modification value is subtracted from the aforesaid rot.

From the amount of the deviation Δhi in the vertical direction, the similar modifications are carried out. In this case, the terms "left" and "right" are substituted by the terms "supper" and "lower" respectively in the above-described procedures (likewise for the reverse).

For the modification of magnification and the amount of rotation, further modification is carried out only in the case where the modification value obtained from the deviation in the vertical direction becomes larger than the modification value having been obtained in the above from the amount of the deviation in the horizontal direction.

For making out the look-up table (LUT), the above-described calculation of the amount of parallel shift, rotation, magnification, and the correction of the distortion aberration is carried out for each of the area sensors to obtain the correction values. Using these values, said look-up table is made out.

The procedure is as follows.

a) For an arbitrary pixel of the final image (the image after the positional corrections and the combination of the images from the respective area sensors 108 are carried out), the co-ordinates on the area sensor concerned 108 (intermediate co-ordinates 1) are obtained. These co-ordinate values represent the ideal position in the case where there are no positional deviation of the area sensor 108, distortion aberration of the lens unit 103, etc.

b) For the intermediate co-ordinates 1, affine transformation is carried out on the basis of the amount of parallel shift and the amount of rotation obtained by the above-described calculation of the amount of parallel shift and the amount of rotation, to obtain the intermediate co-ordinates 2.

c) For the intermediate co-ordinates 2, the intermediate co-ordinates 3 are obtained by adding the correction for the above-described distortion aberration to them.

d) For the above-described intermediate co-ordinates 3, they are corrected in a manner such that the distance from the pixel corresponding to the optical axis of the lens unit 103 have a value multiplied by the magnification mag obtained by the above-described calculation of magnification.

In this alteration of the co-ordinates, in the same way as in the aforesaid correction of the distortion aberration, the co-ordinates are corrected in such a manner as to move in the direction in which only the distance from the pixel. corresponding the optical axis of the lens unit 103 varies.

The co-ordinates of the pixel obtained now is the co-ordinates on the image for calibration which is actually captured for each of the area sensors 108 for the co-ordinates of the pixel concerned in the above-described final image.

e) The co-ordinates of an arbitrary pixel in a) is brought into correspondence to the co-ordinates obtained in d).

f) By carrying out the above-described processing for all the pixels of the aforesaid ideal image, the corresponding area sensor 108 and the position of the pixel on said area sensor 108 is calculated, to make out the look-up table (LUT).

Incidentally, the co-ordinate values obtained in d) do not always become integers. Therefore, for the co-ordinate values obtained in d), they are separated into the integer part and the decimal part, and by making the integer part a value representing the position of the corresponding pixel and the decimal part a value representing the proportional data for making a interpolation processing from the surrounding pixels, the look-up table (LUT) is made out.

For example, in the case where the signal value A of the pixel A(a, b) on the final image corresponds to the co-ordinates (x+α, y+β) (where x and y are integers, and α and β are decimals) on a certain area sensor 108, the values of said pixel A(a, b) are given by the following expression from the signal values E, F, G, and H of the respective pixels E(x, y), F(x+1, y), G (x, y+1), and H (x+1, y+1) on the area sensor, $$A = E \times (1-\alpha)(1-\beta) + F \times \alpha(1-\beta) 30\ G \times (1-\alpha)\beta + H \times \alpha\beta \qquad (3).$$

In the case of ordinary radiographing, by transforming the co-ordinates of each of the pixels on the final image with reference to the above-described look-up table (LUT), making correspondence to the image obtained actually from each of the area sensors 108, the image correcting means 140 carries out all the positional corrections, to obtain the combined image.

In ordinary radiographing, the aforesaid combined image has the image of the object of image capturing 60 and the image of the calibration chart 105 is produced being superposed on it.

When a medical doctor makes diagnosis, if this image of the calibration chart exists, it obstructs the diagnosis, therefore it is desirable to erase the image of the calibration chart 105 at the time of ordinary radiographing. Therefore, it is desirable that the image of the calibration chart is erased by interpolation processing or the like by utilizing the fact that its position is known beforehand.

In particular, in the case where the calibration chart 105 is drawn with a line width appearing in the final image as smaller than 1 pixel or desirably smaller than 1/2 pixel, or in the case where it is drawn with semi-transparent lines, the information of the object of image capturing 60 remains without being erased in the portion of the image of the calibration chart 105. Therefore, by making the structure of the calibration chart 105 be such one as the above-described, it is possible to erase the image of the calibration chart 105 without making interpolation processing by only making the correction of signal level in a manner such that the signal level corresponding to the image of the calibration chart increases.

(The Effects of the Invention)

As described in the foregoing, according to this. invention, suitable corrections can be made for a radiation image obtained by it that radiation transmitted through an object of image capturing is applied to a scintillator, and converting it into an electrical signal after the fluorescent luminescence from this scintillator is made to form an image by one or plural lens unit on one or plural area sensors which are arranged at the positions corresponding to these lens units.

As described in the foregoing, according to this invention, the apparatus has a high reliability, its manufacturing cost can be reduced, the resolution of the image can be easily raised, and it is possible to make the apparatus flat-shaped and of light weight.

What is claimed is:

1. A radiation image capturing apparatus, comprising:
a radiation image detector arranged so as to face a radiation source or an object and comprising
a scintillator to receive a radiation image and to emit image light;
a lens unit array comprising a plurality of lens units and to focus the image light; and
a plurality of area sensors arranged so as to correspond in number to the plurality of lens units and to convert the focused image light into image data; and
a calibrating device comprising a repetition pattern provided at a light incident side of the plurality of area sensors and to conduct calibration to correct the image data converted by the plurality of area sensors on the basis of the repetition pattern,
wherein the radiation image detector has an image capturing region to capture a radiation image of the object, the image capturing region is divided into a plurality of sub-image capturing regions corresponding in number to the plurality of area sensors and an edge portion of a sub-image capturing region of an area sensor is made to overlap with an edge portion of a sub-image capturing region of a neighboring area sensor and wherein the repetition pattern comprises a plurality of marks and one of plurality of marks is located on the overlapped portion of the sub-image capturing regions.

2. The radiation image capturing apparatus of claim 1, wherein the repetition pattern comprises a plurality of marks arranged with a substantially equal pitch.

3. The radiation image capturing apparatus of claim 1, wherein the repetition pattern comprises a plurality of marks arranged so as to correspond to an arrangement of the plurality of area sensors.

4. The radiation image capturing apparatus of claim 1, wherein the repetition pattern is provided at an outside and at a radiation image incoming side of the radiation image detector.

5. The radiation image capturing apparatus of claim 4, wherein the repetition pattern is made of a X-ray intercepting material.

6. The radiation image capturing apparatus of claim 1, wherein the repetition pattern is provided at an inside of the radiation image detector and at a radiation image incoming side of the scintillator.

7. The radiation image capturing apparatus of claim 6, wherein the repetition pattern is made of a X-ray intercepting material.

8. The radiation image capturing apparatus of claim 1, wherein the repetition pattern is provided between the scintillator and the plurality of area sensors.

9. The radiation image capturing apparatus of claim 8, wherein the repetition pattern is provided on a surface of the scintillator at an area sensor side.

10. The radiation image capturing apparatus of claim 8, wherein a transparent member is provided between the scintillator and the plurality of area sensors and the repetition pattern is provided on a surface of the transparent member at a scintillator side.

11. The radiation image capturing apparatus of claim 10, wherein the transparent member is a glass plate.

12. The radiation image capturing apparatus of claim 8, wherein the repetition pattern is made of a X-ray intercepting material.

13. The radiation image capturing apparatus of claim 1, wherein the repetition pattern comprises a plurality of dots.

14. The radiation image capturing apparatus of claim 1, wherein the repetition pattern comprises a plurality of lines.

15. The radiation image capturing apparatus of claim 1, wherein the repetition pattern comprises a plurality of marks and a width of a mark is not larger than three pixels.

16. The radiation image capturing apparatus of claim 1, wherein the repetition pattern is detachably mounted on the radiation image detector.

17. The radiation image capturing apparatus of claim 1, wherein the calibrating device comprises a position correcting section to correct an optical distortion caused by a lens unit and a positional deviation of a pixel caused by a positional deviation of an area sensor.

18. The radiation image capturing apparatus of claim 17, wherein the repetition pattern has a point corresponding to an optical axis of a lens unit and the repetition pattern is arranged such that a positional deviation between the point and the optical axis is not larger than five pixels on a final output image.

19. The radiation image capturing apparatus of claim 1, wherein the repetition pattern has a point corresponding to an optical axis of a lens unit and the repetition pattern is arranged symmetrically around the point.

20. The radiation image capturing apparatus of claim 1, wherein the repetition pattern comprises a plurality of marks whose width is not larger than one pixel of an area sensor.

21. The radiation image capturing apparatus of claim 1, wherein the radiation image detector has an image capturing region and a total area of the repetition pattern is not larger than 3% of the image capturing region.

22. The radiation image capturing apparatus of claim 21, wherein the total area of the repetition pattern is not larger than 1% of the image capturing region.

23. A radiation image capturing apparatus, comprising:
a radiation image detector arranged so as to face a radiation source or an object and comprising
a scintillator to receive a radiation image and to emit image light;
a lens unit array comprising a plurality of lens units and to focus the image light; and
a plurality of area sensors arranged so as to correspond in number to the plurality of lens units and to convert the focused image light into image data; and
a calibrating device comprising a repetition pattern provided at a light incident side of the plurality of area sensors and to conduct calibration to correct the image data converted by the plurality of area sensors on the basis of the repetition pattern,
wherein when the repetition pattern comprises a plurality of marks and a radiation image detector captures a radiation image of the object through the plurality of marks, the signal level obtained through the mark is corrected by using the signal level obtained through a portion other than the mark.

24. A radiation image capturing apparatus, comprising:
a radiation image detector arranged so as to face a radiation source or an object and comprising
a scintillator to receive a radiation image and to emit image light;
a lens unit array comprising a plurality of lens units and to focus the image light; and
a plurality of area sensors arranged so as to correspond in number to the plurality of lens units and to convert the focused image light into image data;
a calibrating device comprising a repetition pattern provided at a light incident side of the plurality of area sensors and to conduct calibration to correct the image data converted by the plurality of area sensors on the basis of the repetition pattern, and a light source to emit light at the time of conducting the calibration.

25. The radiation image capturing apparatus of claim 24, wherein the repetition pattern is made of a light intercepting material.

26. The radiation image capturing apparatus of claim 24, wherein the light source comprises a plurality of point light sources.

27. The radiation image capturing apparatus of claim 26, wherein the point light source is a LED.

28. The radiation image capturing apparatus of claim 26, wherein at least one of the plurality of point light sources is provided for one of the plurality of area sensors.

29. The radiation image capturing apparatus of claim 24, wherein a transparent member is provided between the scintillator and the plurality of area sensors.

30. The radiation image capturing apparatus of claim 29, wherein the light source emits light from a side of the transparent member.

31. The radiation image capturing apparatus of claim 29, wherein the transparent member is a diffusing plate.

32. The radiation image capturing apparatus of claim 29, wherein the transparent member is detachably mounted on the radiation image detector.

33. The radiation image capturing apparatus of claim 29, wherein the repetition pattern is provided on the surface of the transparent member.

34. The radiation image capturing apparatus of claim 24, wherein the light source emits infrared radiation and the repetition pattern is made of a material which reflects or absorbs the infrared radiation and transmits visible light.

35. The radiation image capturing apparatus of claim 24, further comprising a detector to detect a breakdown of the light source and to conduct indicating and warning the breakdown.

36. The radiation image capturing apparatus of claim 35, wherein the detector has an electric power source and detects the breakdown of the light source at the time of actuating the electric power source.

37. A radiation image capturing apparatus, comprising:
   a radiation image detector arranged so as to face a radiation source or an object and comprising
      a scintillator to receive a radiation image and to emit image light;
      a lens unit array comprising a plurality of lens units and to focus the image light; and
      a plurality of area sensors arranged so as to correspond in number to the plurality of lens units and to convert the focused image light into image data; and
   a calibrating device comprising a repetition pattern provided at a light incident side of the plurality of area sensors and to conduct calibration to correct the image data converted by the plurality of area sensors on the basis of the repetition pattern,
   wherein the calibrating device conducts geometrical corrections for the image data obtained from the plurality of area sensors, and
   wherein the calibration device conducts a signal value correction.

38. The radiation image capturing apparatus of claim 37, wherein the calibrating device conducts operations of a shift, a rotation, an enlargement, a reduction and a correction of distortion for the image data in the geometrical corrections.

39. The radiation image capturing apparatus of claim 38, wherein the calibrating device conducts a data converting operation being one of the shift, the rotation, the enlargement, and the reduction after conducting the correction of distortion.

40. The radiation image capturing apparatus of claim 37, wherein the signal value correction includes an offset correction and a gain correction.

41. The radiation image capturing apparatus of claim 37, wherein the calibrating device produces correction data which are read with a resolving power higher than that of image data read ordinarily and uses the correction data in the geometrical corrections.

42. The radiation image capturing apparatus of claim 37, wherein the calibrating device conducts correction for image data obtained from the repetition pattern by the plurality of area sensors.

43. A radiation image capturing apparatus, comprising:
   a radiation image detector arranged so as to face a radiation source or an object and comprising
      a scintillator to receive a radiation image and to emit image light;
      a lens unit array comprising a plurality of lens units and to focus the image light; and
      a plurality of area sensors arranged so as to correspond in number to the plurality of lens units and to convert the focused image light into image data; and
   a calibrating device comprising a repetition pattern provided at a light incident side of the plurality of area sensors and to conduct calibration to correct image data converted by the plurality of area sensors on the basis of the repetition pattern,
   wherein the calibration device comprises a position recognizing section to recognize a predetermined position of the repetition pattern, and a correction amount calculating section to calculate a correction amount for the calibration on the basis of positional information obtained by the position recognizing section, and
   wherein the repetition pattern is shaped in a lattice and the positional recognizer recognizes a cross point in the lattice as a predetermined position for a calibration chart.

44. The radiation image capturing apparatus of claim 43, wherein the correction amount calculating section calculates a correction amount for a distortion of a lens unit on the basis of positional information obtained by the position recognizing section.

45. The radiation image capturing apparatus of claim 43, wherein the correction amount calculating section calculates a correction amount for a position on the basis of positional information obtained by the position recognizing section.

46. The radiation image capturing apparatus of claim 43, wherein the correction amount calculating section calculates a difference in an image size caused by dispersion in focal distance among the plurality of lens units on the basis of positional information obtained by the position recognizing section.

47. The radiation image capturing apparatus of claim 43, wherein the correction amount calculating section calculates a correction amount for a position on the basis of positional information obtained by the position recognizing section, wherein the calibrating device comprises a correction amount revising section, and wherein the correction amount revising section conducts a positional correction for one reference point or plural reference points having the same position with or different positions from the predetermined position recognized by the recognizer by using the correction amount and revises the correction amount by evaluating the corrected position.

48. A radiation image capturing apparatus, comprising:
a radiation image detector arranged so as to face a radiation source or an object and comprising
a scintillator to receive a radiation image and to emit image light;
a lens unit array comprising a plurality of lens units and to focus the image light; and
a plurality of area sensors arranged so as to correspond in number to the plurality of lens units and to convert the focused image light into image data; and
a calibrating device comprising a calibrating section to conduct calibrating automatically at a predetermined timing and a memory to store correction data obtained by the calibrating section.

49. The radiation image capturing apparatus of claim 48, wherein the calibrating section conducts calibrating automatically at a predetermined time after turning on a power source.

50. The radiation image capturing apparatus of claim 48, wherein the calibrating section conducts calibrating automatically at a predetermined time after conducting the calibrating previously on a condition that a power source is kept on.

51. The radiation image capturing apparatus of claim 48, wherein the calibrating device comprises a counting section to count a cumulative number of times of image capturing and the calibrating section conducts calibrating automatically when the number of times after conducting calibrating previously become a predetermined number of times.

52. A radiation image capturing apparatus, comprising:
a radiation image detector arranged so as to face a radiation source or an object and comprising
a scintillator to receive a radiation image and to emit image light;
a lens unit array comprising a plurality of lens units and to focus the image light; and
a plurality of area sensors arranged so as to correspond in number to the plurality of lens units and to convert the focused image light into image data; and
a calibrating device comprising a calibrating section to conduct calibrating and a calibration designating section to designate a calibrating method and/or a calibrating timing.

53. A radiation image capturing apparatus, comprising:
a radiation image detector arranged so as to face a radiation source or an object and comprising
a scintillator to receive a radiation image and to emit image light;
a lens unit array comprising a plurality of lens units and to focus the image light; and
a plurality of area sensors arranged so as to correspond in number to the plurality of lens units and to convert the focused image light into image data; and
a calibrating device comprising a calibrating section to conduct calibrating and a calibration starting section to start a calibration at an optional timing.

54. A radiation image capturing apparatus, comprising:
a radiation image detector arranged so as to face a radiation source or an object and comprising
a scintillator to receive a radiation image and to emit image light;
a lens unit array comprising a plurality of lens units and to focus the image light; and
a plurality of area sensors arranged so as to corresponding number to the plurality of lens units and to convert the focused image light into image data; and
a calibrating device comprising a repetition pattern provided at a light incident side of the plurality of area sensors and to conduct calibration to correct a positional relationship among the image data converted by the plurality of area sensors on the basis of the repetition pattern,
wherein the calibrating device further comprises a distortion correcting section to correct an optical distortion on the image data caused by each of the plurality of lens units and a positional deviation correcting section to correct a positional deviation of the image data caused by a positional deviation of each of the plurality of area sensors and
wherein the calibrating device corrects the positional deviation after correcting the optical distortion.

55. The radiation image capturing apparatus of claim 54, wherein the positional deviation correcting section conducts operations of a shift, a rotation, an enlargement, and a reduction.

* * * * *

UNITED STATES PATENT AND TRADEMARK OFFICE
CERTIFICATE OF CORRECTION

PATENT NO. : 6,476,394 B1 Page 1 of 1
APPLICATION NO. : 09/718548
DATED : November 5, 2002
INVENTOR(S) : Kouji Amitani et al.

It is certified that error appears in the above-identified patent and that said Letters Patent is hereby corrected as shown below:

Column 4,
Line 48, after "image" delete "cap turing" and insert therefor --capturing--.

Column 29,
Line 64, after "i/" insert --i--.

Column 32,
Line 21, before "$G_x$" delete "30".

Signed and Sealed this

Seventeenth Day of April, 2007

JON W. DUDAS
*Director of the United States Patent and Trademark Office*